(12) United States Patent
Yadav

(10) Patent No.: US 9,955,160 B1
(45) Date of Patent: Apr. 24, 2018

(54) VIDEO ENCODING USING ADAPTIVE PRE-FILTERING

(71) Applicant: Harmonic, Inc., San Jose, CA (US)

(72) Inventor: Ganesh Yadav, Milpitas, CA (US)

(73) Assignee: Harmonic, Inc., San Jose, CA (US)

( * ) Notice: Subject to any disclaimer, the term of this patent is extended or adjusted under 35 U.S.C. 154(b) by 282 days.

(21) Appl. No.: 14/798,223

(22) Filed: Jul. 13, 2015

Related U.S. Application Data

(63) Continuation-in-part of application No. 14/697,151, filed on Apr. 27, 2015.

(51) Int. Cl.
| | |
|---|---|
| *H04N 7/12* | (2006.01) |
| *H04N 11/02* | (2006.01) |
| *H04N 19/117* | (2014.01) |
| *H04N 19/176* | (2014.01) |
| *H04N 19/139* | (2014.01) |
| *H04N 19/172* | (2014.01) |
| *H04N 19/61* | (2014.01) |

(52) U.S. Cl.
CPC ......... *H04N 19/117* (2014.11); *H04N 19/139* (2014.11); *H04N 19/172* (2014.11); *H04N 19/176* (2014.11); *H04N 19/61* (2014.11)

(58) Field of Classification Search
CPC .... H04N 19/61; H04N 19/117; H04N 19/139; H04N 19/176
See application file for complete search history.

(56) References Cited

U.S. PATENT DOCUMENTS

| | | | |
|---|---|---|---|
| 6,037,986 A | 3/2000 | Zhang et al. | |
| 7,430,329 B1 * | 9/2008 | Sarna | H04N 19/61 348/404.1 |
| 9,001,889 B2 * | 4/2015 | Lu | H04N 19/159 375/240.03 |
| 9,326,006 B2 * | 4/2016 | Chiang | H04N 19/139 |
| 2007/0172211 A1 * | 7/2007 | Panda | H04N 19/117 386/313 |
| 2009/0080517 A1 | 3/2009 | Ko et al. | |
| 2010/0158126 A1 | 6/2010 | Bai et al. | |
| 2013/0287112 A1 * | 10/2013 | Gisquet | H04N 19/52 375/240.16 |

* cited by examiner

*Primary Examiner* — Tsion B Owens
(74) *Attorney, Agent, or Firm* — Brokaw Patent Law PC; Christopher J. Brokaw

(57) ABSTRACT

Approaches for digital video encoding based, at least in part, on adaptive pre-filtering of the digital video. A user may select values for a plurality of video quality preference categories. An adaptive video preprocessor determines adaptive preprocessor information for the digital video, based, at least in part, on the current video complexity of the digital video and an output bit rate. The encoder encodes the digital video to produce encoded digital video using the adaptive preprocessor information. In this way, for example, the encoder may dynamically adjust how the digital video is encoded based on a selection, made by the user, regarding a stress bias video quality preference.

17 Claims, 7 Drawing Sheets

Quantization error

| 16 | 16 | 16 | 16 | 16 | 16 | 16 | 16 |
|----|----|----|----|----|----|----|----|
| 16 | 16 | 16 | 16 | 16 | 16 | 16 |    |
| 16 | 16 | 16 | 16 | 16 | 16 |    |    |
| 16 | 16 | 16 | 16 | 16 |    |    |    |
| 16 | 16 | 16 | 16 |    |    |    |    |
| 16 | 16 | 16 |    |    |    |    |    |
| 16 | 16 |    |    |    |    |    |    |
| 16 |    |    |    |    |    |    |    |

FIG. 8

| 16 | 17 | 18 | 19 | 20 | 21 | 22 | 23 |
|----|----|----|----|----|----|----|----|
| 17 | 18 | 19 | 20 | 21 | 22 | 23 |    |
| 18 | 19 | 20 | 21 | 22 | 23 |    |    |
| 19 | 20 | 21 | 22 | 23 |    |    |    |
| 20 | 21 | 22 | 23 |    |    |    |    |
| 21 | 22 | 23 |    |    |    |    |    |
| 22 | 23 |    |    |    |    |    |    |
| 23 |    |    |    |    |    |    |    |

FIG. 9

| 20 | 21 | 26 | 29 | 41 | 46 | 53 | 61 |
|----|----|----|----|----|----|----|----|
| 21 | 26 | 29 | 39 | 46 | 53 | 61 |    |
| 26 | 29 | 41 | 46 | 51 | 61 |    |    |
| 29 | 36 | 44 | 48 | 53 |    |    |    |
| 36 | 44 | 48 | 53 |    |    |    |    |
| 44 | 48 | 53 |    |    |    |    |    |
| 46 | 51 |    |    |    |    |    |    |
| 51 |    |    |    |    |    |    |    |

FIG. 10

| 8 | 16 | 19 | 22 | 26 | 27 | 29 | 34 |
|---|---|---|---|---|---|---|---|
| 16 | 16 | 22 | 24 | 27 | 29 | 34 | |
| 19 | 22 | 26 | 27 | 29 | 34 | | |
| 22 | 22 | 26 | 27 | 29 | | | |
| 22 | 26 | 27 | 29 | | | | |
| 26 | 27 | 29 | | | | | |
| 26 | 27 | | | | | | |
| 27 | | | | | | | |

FIG. 11

| 16 | 16 | 16 | 16 |
|---|---|---|---|
| 16 | 16 | 16 | |
| 16 | 16 | | |
| 16 | | | |

FIG. 12

VIDEO ENCODING USING ADAPTIVE PRE-FILTERING

CLAIM OF PRIORITY

This application is a continuation-in-part of, and claims priority to, U.S. patent application Ser. No. 14/697,151, filed on Apr. 27, 2015, entitled "Adaptive Pre-Filtering Based on Video Complexity and Output Bit Rate," the entire contents of which are incorporated by reference for all purposes as if fully set forth herein.

FIELD OF THE INVENTION

Embodiments of the invention generally relate to digital video encoding technique based, at least in part, on adaptive pre-filtering of the digital video.

BACKGROUND

Motion video signals typically contain a significant amount of spatial and temporal redundancy. Video compression techniques take advantage of such spatial and temporal redundancy to reduce the amount of data bandwidth required to process, transmit and store video signals. MPEG-2 is a well-known video compression standard developed by the International Standards Organization (ISO) Moving Picture Experts Group (MPEG) and documented in "Information Technology Generic Coding of Moving Pictures and Associated Audio Information: Video," ISO/IEC DIS 13818-2 (Video), which is incorporated herein by reference. MPEG-2 video compression involves both spatial and temporal compression of video frames or fields. Other video standards, such as AVC 14496-10 and HEVC, also call for video compression techniques that involve both spatial and temporal compression of video frames or fields.

A digital video encoder is a component which converts digital video from one format to another for the purposes of standardization, speed, secrecy, security, and/or compression. A digital video encoder may receive a sequence of video frames or fields from a video source. Spatial compression may be applied to the video frames by the digital video encoder using the techniques of transform encoding, quantization, scanning, run-amplitude encoding and variable length coding for example. Temporal compression may be applied to the video frames by the digital video encoder using the techniques of motion estimation and motion compensation as an example.

Video preprocessing (also known as pre-filtering) techniques are applied prior to performing spatial and temporal compression. A digital video preprocessor is a component that processes a digital video signal using one or more preprocessing filters so that the digital video may be more efficiently compressed by subsequent video compression components, such as a digital video encoder. For example, the digital video preprocessor may alter the format of each frame in terms of the number of horizontal or vertical pixels in order to meet parameters specified by a video compression component. In addition, a digital video preprocessor may detect and beneficially inform a video compression component of certain scene changes and/or other image variations (such as a fade) in the digital video which increase compression difficulty.

Conventional video preprocessing techniques have generally been concerned with detecting and correcting obvious problematic situations in the visible content of the digital video, such as format alterations, scene changes and fades.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 8 is a table that illustrates a non-limiting example of a quantization matrix suitable for when the stress bias mode is configured to be "sharper picture" and in PSNR mode for MPEG2 intra-frame coding when $qmatrix_{13}idx==1$;

FIG. 9 is a table that illustrates a non-limiting example of a quantization matrix suitable for MPEG2 intra-frame coding when qmatrix_idx==1;

FIG. 10 is a table that illustrates a non-limiting example of a quantization matrix suitable for MPEG2 intra-frame coding when qmatrix_idx==2;

FIG. 11 is a table that illustrates a non-limiting example of a quantization matrix suitable for MPEG2 intra-frame coding.

FIG. 12 is a table that illustrates a non-limiting example of a quantization matrix suitable for AVC intra-frame coding for all three components.

DETAILED DESCRIPTION OF THE INVENTION

Approaches for digital video encoding based, at least in part, on adaptive pre-filtering of the digital video are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

FUNCTIONAL OVERVIEW

Embodiments of the invention provide approaches for an adaptive video encoder. An adaptive video encoder of an embodiment encodes digital video in a manner that takes advantage of adaptive pre-filtering of digital video performed prior to the encoding process. Embodiments of the invention may be used to perform video encoding in a manner that improves the quality of encoding digital video at all output bit rates.

In an embodiment, a user may select values for a plurality of video quality preference categories. An adaptive video preprocessor determines adaptive preprocessor information for the digital video, based, at least in part, on the current video complexity of the digital video and an output bit rate. The encoder encodes the digital video to produce encoded digital video using the adaptive preprocessor information. In this way, for example, the encoder may dynamically adjust how the digital video is encoded based on a selection, made by the user, regarding a stress bias video quality preference. Additional embodiments and features shall be discussed below.

Illustrative System

Figure 1:
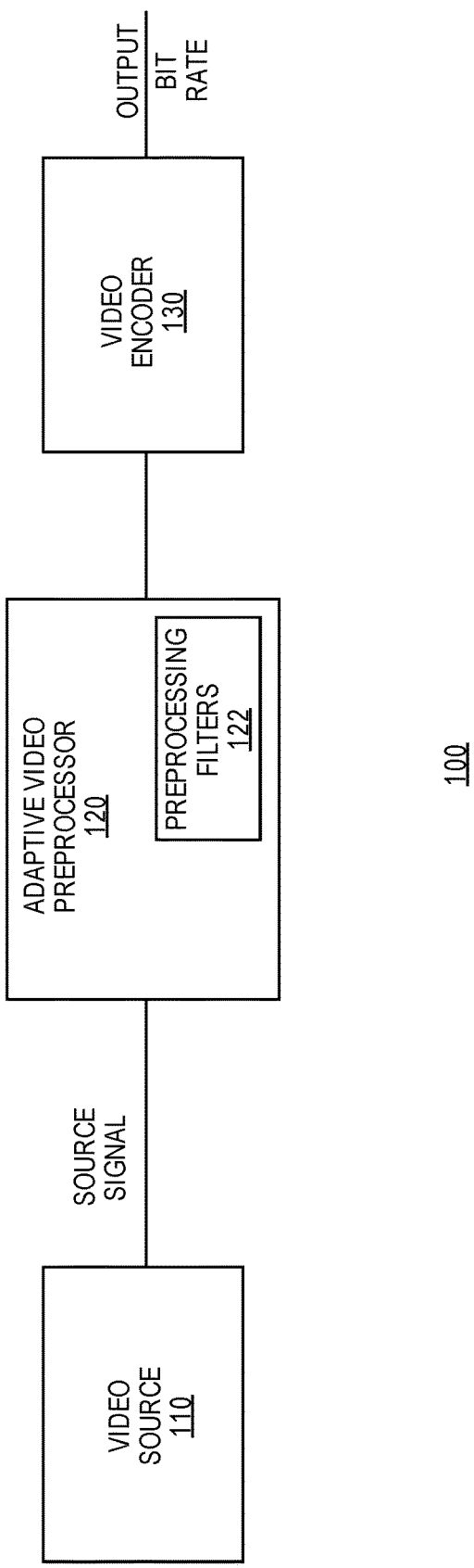
FIG. 1 is a block diagram depicts a system that includes an adaptive video preprocessor according to an embodiment of the invention.

FIG. 1 is a block diagram depicts a system 100 that includes adaptive video preprocessor 120 according to an embodiment of the invention. System 100 includes video source 110, adaptive video preprocessor 120, and video encoder 130. Video source 110 corresponds to any source of a digital video.

Adaptive video preprocessor 120 is a software component configured to perform adaptive pre-filtering or preprocessing of digital video as described herein. Adaptive video preprocessor 120 may perform pre-filtering using a set of one or more preprocessing filters 122. Embodiments may use different numbers and types of preprocessing filters 122. A non-limiting, illustrative list of the types of preprocessing filters which may be included in one or more preprocessing filters 122 include without limitation: a deblocking preprocessing filter, a mosquito noise reduction (MNR) preprocessing filter, a horizontal low-pass preprocessing filter (HLPF), the motion compensated temporal preprocessing filter (MCTF), a sharpening preprocessing filter, and a chroma boost preprocessing filter.

Video encoder 130 is a software component which converts digital video from one format to another for the purposes of standardization, speed, secrecy, security, and/or compression. For clarity, once video encoder 130 has processed a portion of digital video, the processed portion of digital video will be referred to as encoded digital video. Video encoder 130 sends encoded digital video over a channel that has an output bit rate which fluctuates over time.

Pre-Processing Filter Strength and Video Quality Preference Categories

Adaptive video preprocessor 120 may perform pre-filtering using a set of one or more preprocessing filters 122. Each preprocessing filter 122 may be configured to operate according to a particular strength setting. A preprocessing filter having a greater strength value will process digital video to a greater extent than the same preprocessing filter having a lower strength value. Note, as used herein, the terms "pre-filtering" and "preprocessing" both refer to the same concept, namely the processing of digital video using one or more preprocessing filters so that the digital video may be more efficiently compressed by subsequent video compression components (such as a digital video encoder).

Embodiments of the invention may expose a user interface (a "filter user interface") which allows a user, such as someone associated with an entity responsible for transmitting digital video, to configure the strength setting of each of one or more preprocessing filters 122. In an embodiment, the filter user interface may depict a certain number of video quality preference categories. A user could select values using the filter user interface for each of the video quality preference categories. The values selected for each of the video quality preference categories can, in turn, be translated into particular default strength settings for certain preprocessing filters 122 associated with that video quality preference category. The advantage of such an approach is that it enables a user to express their video quality preferences using natural language rather than in the less intuitive native settings of a preprocessing filter 122.

Embodiments of the invention may use any number of video quality preference categories. Also, each video quality preference category could have any number of allowable values, depending upon how many options one wishes to provide the user. To illustrate a concrete example, an embodiment may provide three video quality preference categories: stress bias, noise reduction, and picture enhancement. The stress bias video quality preference category may be assigned one of three possible values, namely: sharp, balanced, and clear, which correspond to weak, medium, and strong filtering strengths respectively. The noise reduction video quality preference category may be assigned one of five possible values, namely: disabled, automatic, weak, medium, and strong. The picture enhancement video quality preference category may also be assigned one of five possible values, namely: disabled, automatic, weak, medium, and strong.

In this extended example, if disabled is selected for either the noise reduction video quality preference category or the picture enhancement video quality preference category, then certain preprocessing filters 122 which are associated with the disabled category will themselves become disabled (i.e., disabled preprocessing filters will not be used by adaptive video preprocessor 120). If automatic is selected for either the noise reduction video quality preference category or the picture enhancement video quality preference category, then the strength of those filters in preprocessing filters 122 associated with the automatic category will be automatically determined by adaptive video preprocessor 120 based on the complexity-output bit rate-ratio.

Figure 2:
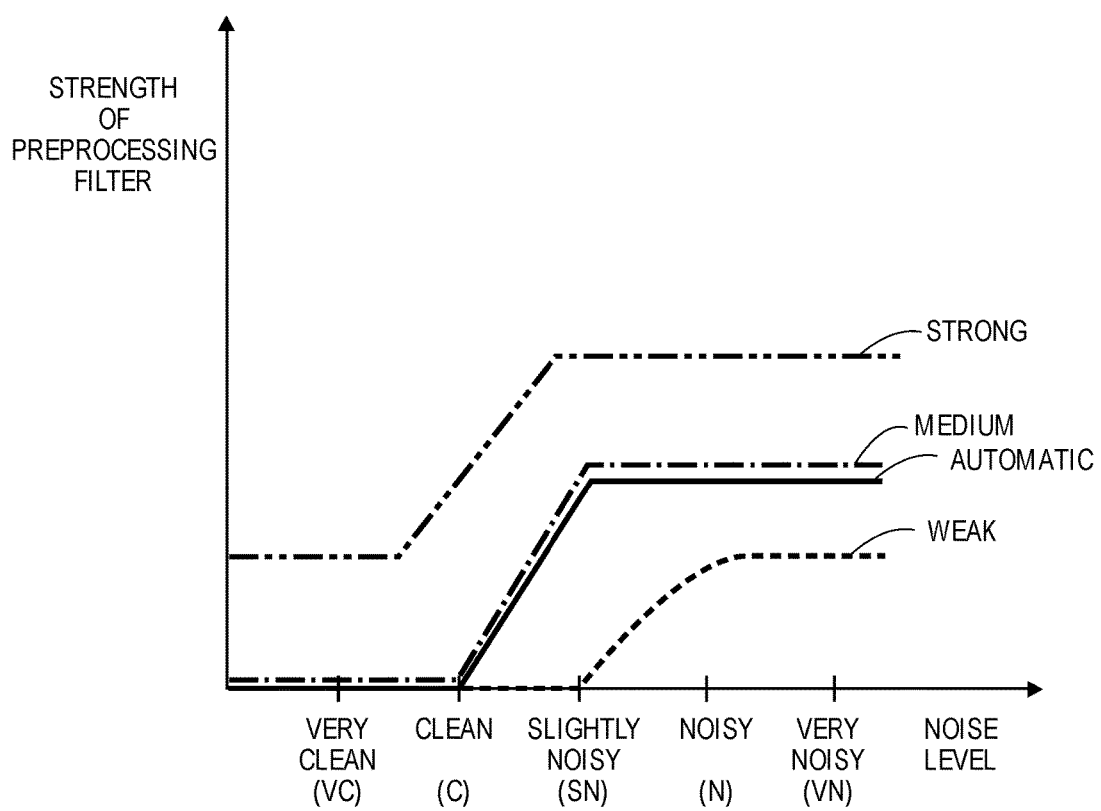
FIG. 2 is an illustration of the relative strengths assigned to an exemplary preprocessing filter based on different selected values of a video quality preference category for a particular output bitrate according to an embodiment of the invention.

If a video quality preference category is assigned a value of weak, medium, or strong, then the strength of any preprocessing filters 122 associated with that video quality preference category will be based on an adjustment or offset from the automatic filter strength dependent upon the particular value selected. To illustrate, consider FIG. 2, which is an illustration of a strength profile for a particular output bit rate or range of output bit rates. The strength profile of FIG. 2 shows the relative strengths assigned to an exemplary preprocessing filter based on different selected values of a video quality preference category for that preprocessing filter. For example, FIG. 2 depicts the strength profile the selected values of strong, medium, automatic, and weak.

In FIG. 2, note that the strength of the preprocessing filter will change according to the noise level of the digital video. FIG. 2 depicts five different noise levels, namely very clean (VC), clean (C), slightly noisy (SN), noisy (N), and very noisy (VN). The five noise levels depicted in FIG. 2 are merely examples; embodiments may use any number of noise level and any criteria or methodology for determining what amount of noise corresponds to a particular noise level.

Also, note that the strength profile of FIG. 2 depicts the relative strengths assigned to an exemplary preprocessing filter for a particular output bit rate or range of output bit rates. Embodiments may employ any number of different strength profiles that are each associated with a different output bit rate or range of output bit rates.

As show in FIG. 2, the strength of any preprocessing filter 122 having a video quality preference category assigned a value of medium will closely track the strength assigned to the value of automatic. An embodiment may employ a strength profile that assigns the same strength of any preprocessing filter 122 having a video quality preference category assigned a value of medium as the strength assigned to a preprocessing filter 122 having a video quality preference category assigned a value of the value of automatic. In other embodiments, the strength profile may be used that assigns a similar, but not identical, strength of any preprocessing filter 122 having a video quality preference category assigned a value of medium as the strength assigned to a preprocessing filter 122 having a video quality preference category assigned a value of the value of automatic.

An aim of adaptive video preprocessor 120 is to enhance the subjective video quality of digital video encoded by video encoder 130 at all output bitrates. To do so, adaptive video preprocessor 120 may reduce the complexity of the digital video content at lower output bitrates and enhance details of the content in the digital video at higher output bitrates. Correspondingly, adaptive video preprocessor 120 may slightly increase the complexity of the content in the digital video at higher output bitrates. A balanced approach may be taken by adaptive video preprocessor 120 when the output bitrate is in the middle range.

To enhance the subject video quality of digital video, adaptive video preprocessor 120 may dynamically adjust the strength of the preprocessing filters 122 used the strength profiles discussed above with respect to FIG. 2.

Using Qscale to Improve Subjective Video Quality

Figure 3:
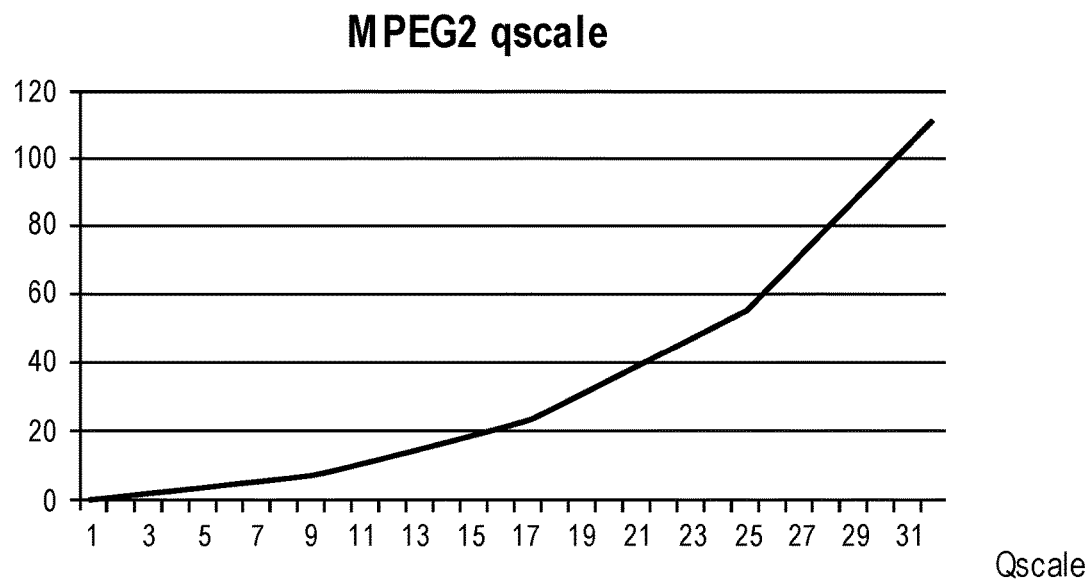
FIG. 3 depicts a qscale range extending from low quantization error at lower qscales to higher quantization error at higher qscales for the MPEG2 digital video protocols using an adaptive video preprocessor according to an embodiment of the invention.
Figure 4:
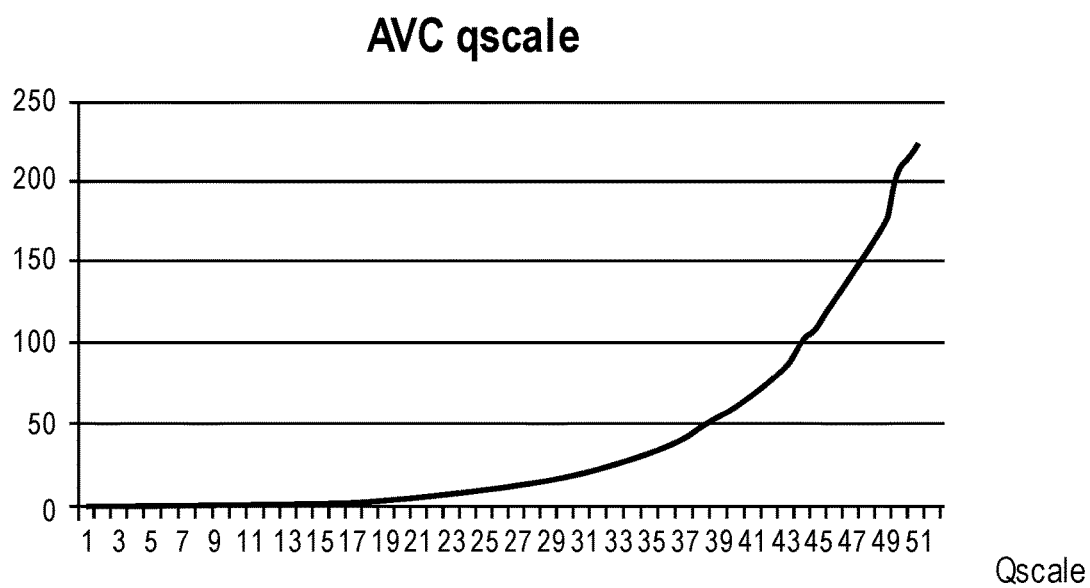
FIG. 4 depicts a qscale range extending from low quantization error at lower qscales to higher quantization error at higher qscales for the AVC digital video protocols using an adaptive video preprocessor according to an embodiment of the invention.

Qscale refers to a measure that represents variable bitrate qualities such that the lower the qscale value, the higher the quality of the digital video. FIGS. 3 and 4 depict a qscale range extending from low quantization error (y-axis) at lower qscales (x-axis) to higher quantization error at higher qscales for the MPEG2 and AVC digital video protocols respectively. The MPEG2 qscale range shown in FIG. 3 and the AVC qscale range shown in FIG. 4 both cover a range extending from low quantization error (y-axis) at lower qscales (x-axis) to high quantization error (y-axis) at high qscales (x-axis). When digital video has a high qscale value, the high quantization error of the digital video could introduce ringing artifacts at high spatial frequencies and blockiness on block transform boundaries.

To improve the subjective video quality, adaptive video preprocessor 120 may dynamically adjust the strength of preprocessing filters 122 such that the edges need to be smoothened at low output bitrates or high qscale values. Edges are points in a digital image at which the image brightness changes sharply or, more formally, has discontinuities. The points at which image brightness changes sharply are typically organized into a set of curved line segments termed edges. On the other hand, the source digital video could be edge enhanced (i.e., boosting the edges, leading to sharpening the edges of objects) by high pass filtering at low qscale values. Adaptive video preprocessor 120 may consult appropriate statistics to determine the present qscale value of the digital video; thereafter adaptive video preprocessor 120 will dynamically use low pass filtering for high qscales, high pass filtering for lower qscales, and bandpass filtering for the middle range of qscales. Thus, a combination of lowpass, highpass and bandpass filters can be used to support edge enhancement, texture smoothing, and passthrough (in this context passthrough means not performing any filtering on the input video signal).

The greater the amount of motion in a portion of digital video, the greater the difficulty in predicting the details of the digital video frames in that portion. As a result, adaptive video preprocessor 120 of an embodiment may favor picture smoothing filters over picture sharpening filters when there is considerably high motion between successive frames in the digital video being processed.

For high quality video using low qscales, it is desirable to obtain sharp video even though the enhanced high frequency components could slightly increase the overall qscale value for the picture. When video encoder 130 uses high qscale values, certain undesirable artifacts in the appearance of the digital video may be produced. Advantageously, adaptive video preprocessor 120 may employ a smoothened picture preprocessing filter 122 to reduce the qscale or alleviate the appearance of discontinuous artifacts when the qscale value exceeds a particular threshold.

Dynamically Configuring Preprocessing Filters

The complexity-output bit rate ratios and the amount of noise in a source signal are metrics which may be used in configuring the strength of certain preprocessing filters 122 used by adaptive video preprocessor 120. For example, the strength of motion compensated temporal preprocessing filter (MCTF) and the sharpening preprocessing filter may be configured by adaptive video preprocessor 120 based on the complexity-output bit rate ratios (or basequant) and the amount of noise in a source signal. Other metrics may also be used by adaptive video preprocessor 120 in configuring the strength of preprocessing filters 122 used by adaptive video preprocessor 120. For example, to dynamically configure the strength of the deblocking preprocessing filter, adaptive video preprocessor 120 may consult a metric which indicates the amount of blockiness in the source signal. As another example, to dynamically configure the strength of the mosquito noise reduction (MNR) preprocessing filter, adaptive video preprocessor 120 may consult a metric which indicates the amount of mosquito noise in the source signal.

Figure 5:
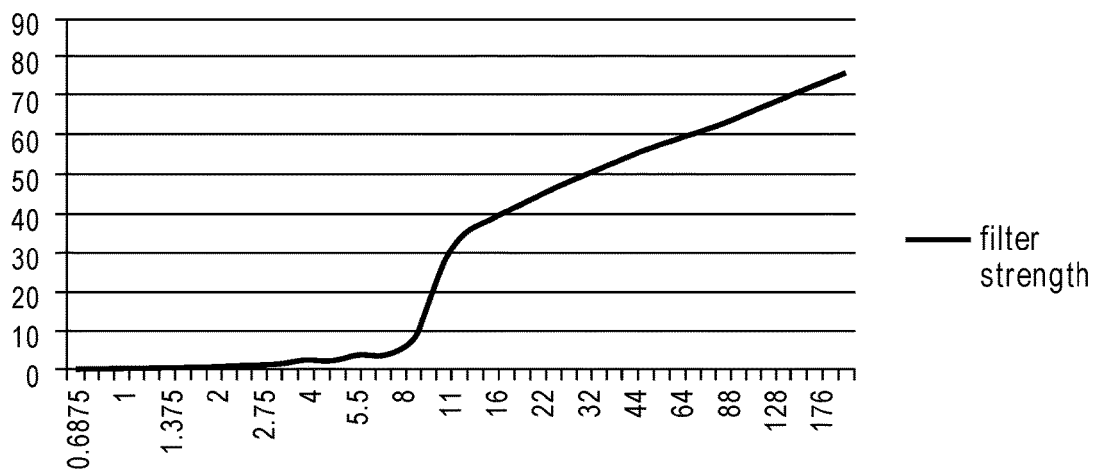
FIG. 5 depicts a filter strength curve according to an embodiment of the invention.

In an embodiment, the strengths of those preprocessing filters 122 may be determined by filter index mapping in lieu of actually traversing the curve on each filter. FIG. 5 depicts a first filter strength curve according to one embodiment of the invention. In the example illustrated by FIG. 5, the following equation may be used to derive the filter strength of the noise reduction or HLPF filter(s) based on the basequant:

$$\text{basequant strength} = ((qp+1)*(qscale-qscale(17)/(1+ABS(qscale-qscale(17)))+(qp+1))*0.75$$

Figure 6:
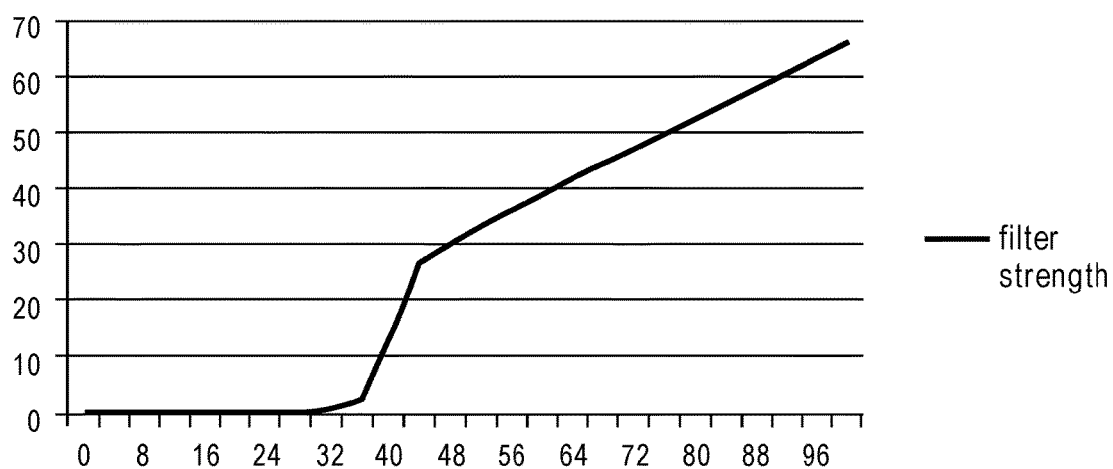
FIG. 6 depicts another filter strength curve according to an embodiment of the invention.

To illustrate another example of filter index mapping, consider FIG. 6, which depicts another filter strength curve according to an embodiment of the invention. The following equation may be used to derive the filter strength of the noise reduction or HLPF filter(s) based on the noise level.

noiselevel strength=(noise level*(noiselevel−40)/(1+ABS(noiselevel−60))+noise level)/3 final_strength=(basequant_strength+noiselevel_strength)/2

In lieu of quantizing the basequant and/or noise level into different regions, a curve tracing strategy such as the above approach may be used to derive more fine-grained filter strength values than relying upon strength values assigned to different regions of the curve. Using this exemplary curve tracing strategy may also be employed to dynamically obtain the filter strength for other preprocessing filters, such as MCTF and HLPF.

In an embodiment, preprocessing filters such as sharpening and chroma boost may also have their strengths dynamically determined using a curve tracing strategy, e.g., by using the following equations:

basequant strength=76−((qp+1)*(qscale−qscale(17)/(1+ABS(qscale−qscale(17)))+(qp+1))*0.75 noiselevel strength=67−(noise_level*(noiselevel−40)/(1+ABS(noiselevel−60))+noise_level)/3 final_strength=(basequant_strength+noiselevel_strength)/2

The purpose of filter index mapping is to enhance edges (boosting the edges, leading to the sharpening of object edges) by high pass filtering if encoding artifacts are imperceptible at low qscales and to reduce the high spatial frequency components by low pass filtering if encoding artifacts dominate the noise at high qscales.

More complicated filter selection and adaptation may be used by embodiments. For example, to configure the motion compensated temporal preprocessing filter (MCTF), adaptive video preprocessor 120 of an embodiment may consult the basequant, motion statistics and the amount of noise in a source signal. As another example, to configure the horizontal low-pass preprocessing filter (HLPF), adaptive video preprocessor 120 of an embodiment may consult the basequant and the horizontal activity of the digital video. Additionally, to configure the sharpening preprocessing filter, adaptive video preprocessor 120 of an embodiment may consult the basequant, the amount of noise in the source signal, and the average macroblock activity. To configure the mosquito noise reduction (MNR) preprocessing filter, adaptive video preprocessor 120 of an embodiment may consult the basequant, the amount of noise in the source signal, the average macroblock activity, and a mosquito noise measure. As one more example, to configure the control deblocking preprocessing filter, adaptive video preprocessor 120 of an embodiment may consult the basequant, the amount of noise in the source signal, the vertical and horizontal activity, and a blockiness measure.

Adaptive video preprocessor 120 of an embodiment operates under the principles that (a) the level of noise in a digital video stream should be able to catch noise, ringing or blockiness (b) if there is noise present in the digital video which is difficult to encode and causes strain on the encoding process (perhaps caused by an area of an image that requires to many bits to describe and thus starves other areas of bits, leading to distortion to the image as a whole), then the basequant value should already reflect this condition, and (c) there is no need to get rid of miniscule noise or film grain when the output bitrate allows such noise or film grain to be encoded by video encoder 130. Embodiments may employ more complicated schemes if their value offsets any additional burden resulting from their complexity.

One of the most challenging issues in designing a preprocessing filter 122 for digital video is the need to distinguish between noise and feature, as doing so is not possible without a reasonably accurate estimation of the noise in the digital video. Knowledge of how much noise is present in a digital video helps the preprocessing filter 122 to clean the noise from digital video signal, which in turn allows video encoder 130 to spend more bits of data describing features rather than noise. However, caution should be taken to avoid cleaning up intentional pleasing noise, such as film grain for example.

One of the problems presented by a sharpening filter is that it increases background noise while decreasing the usable signal. To alleviate this problem, it is important to control the noise level using the motion compensated temporal preprocessing filter (MCTF) in conjunction with the sharpening preprocessing filter. One of the goals of the sharpening preprocessing filter is to decrease contours caused by compression. This is achieved through contrast enhancement in the flat gradients leading to cleaner dither of flat gradients and cleanly coded flat areas. The motion compensated temporal preprocessing filter (MCTF) and the sharpening preprocessing filter also preserve or enhance resolution.

Classifying Complexity-Output Bit Rate Ratios

Embodiments may classify complexity-output bit rate ratios (e.g., basequant values) into various categories, for example non-stressful (NS), stressful (S) and very stressful (VS).

In an embodiment, when the complexity-output bit rate ratio is deemed non-stressful (NS), the sharpened preprocessing filter is enabled and used and the MCTF preprocessing filter is disabled and not used. When the complexity-output bit rate ratio is deemed stressful (S), the sharpening preprocessing filter and the MCTF preprocessing filter are both enabled and used. When the complexity-output bit rate ratio is deemed very stressful (VS), the sharpened preprocessing filter is disabled and not used and the MCTF preprocessing filter is enabled and used.

In an embodiment, $$\text{basequant} = \sum_{k=0}^{n} X_k / \text{bitrate},$$

where n is number of pictures in a second, $X_k$ is complexity of picture k. $X_k$=picsize$_{pictype}$*qscale$_{pictype}$/K$_{pictype}$, where pictype could be a different picture type I, P, B, b, or different B/b pictures in the hierarchy. K$_{pictype}$ is the qscale multiplier for a given picture type. Typical values of K$_{pictype}$ are 1.0 for I pictures, 1.41 for P picture, 1.26 for B picture and b=K$_B$*1.12 and so on for different B pictures in the hierarchy. Thus, basequant is the normalized spatial complexity parameter for a group of pictures.

The stress or source complexity for various bitrates may be classified based on the basequant values. If the source video is an MPEG2 digital video, then the basequant could take one of the values on the MPEG2 qscale curve shown in FIG. 2. To illustrate one example, for the MPEG2 protocol:

If basequant<22, content is NS for this bitrate,
Else if basequant<52, content is S for this bitrate,
Else if basequant<80, content is VS for this bitrate, Else If basequant>=80, content is Extremely Stressful (ES) for this bitrate.

If the source video is an AVC digital video, then the basequant could take one of the values on the AVC qscale curve shown in FIG. 3. To illustrate an example, for the AVC protocol:

If basequant<18, content is NS for this bitrate,
Else if basequant<56, content is S for this bitrate,
Else if basequant<104, content is VS for this bitrate,
Else If basequant>=104, content is Extremely Stressful (ES) for this bitrate.

Note that the above values are merely examples, as other embodiments may use different basequant values to differentiate between categories of complexity-output bit rate ratios or basequants. By the same token, the number of categories of complexity-output bit rate ratios or basequants discussed above are merely exemplary of one embodiment, as other embodiments of the invention may use fewer or a greater number of categories.

Configuring the MCTF Preprocessing Filter

The relative strength of the motion compensated temporal preprocessing filter (MCTF) may be dynamically adjusted by adaptive video preprocessor 120 based on the complexity-output bit rate ratios (or basequant) and the amount of noise in a source signal. Speed is filtered less to reduce the reaction time of various filters to high motion activity depicted by the digital video. The motion compensated temporal preprocessing filter (MCTF) is the most reactive filter of the one or more preprocessing filters 122 in terms of delay.

Table 1 depicts the adaptive strength assigned to the motion compensated temporal preprocessing filter (MCTF) by adaptive video preprocessor 120 when the MCTF is operating in automatic mode:

TABLE 1

|    | VC | C | SN | N | VN |
|----|----|----|----|----|----|
| NS | 0  | 0 | 1  | 2 | 2  |
| S  | 0  | 1 | 2  | 2 | 3  |
| VS | 1  | 2 | 3  | 3 | 3  |

In Table 1, the strength values 1-5 correspond to Very Weak (VW), Weak (W), Medium (M), Strong (S), to Very Strong (VS) respectively. A strength value of 0 indicates that the filter is disabled. In an embodiment, when the video quality preference category of noise reduction has a value of automatic, the strength settings of the MCTF are those depicted in FIG. 1. Note that the particular strength setting of the MCTF will depend upon whether the complexity-output bit rate ratio (or basequant) is non-stressful (NS), stressful (S) and very stressful (VS). Further note that the particular strength setting of the MCTF will depend upon whether the level of noise in the digital video is deemed Very Clean (VC), Clean (C), Slightly Noisy (SN), Noisy (N), or Very Noisy (VN) as well as whether the signal is deemed to be very stressful (VS), stressful (S), or non-stressful (NS) by embodiments. Any approach for classifying the level of noise into the categories may be used to classify the level of noise as VC, C, SN, N, or VN by embodiments; similarly, any approach for classifying the stress of the video signal into the categories may be used to classify the stress of the video signal as VS, S, or NS by embodiments.

The strength of the motion compensated temporal preprocessing filter (MCTF) will be automatically adapted by adaptive video preprocessor 120 when the video quality preference category of noise reduction is in either Weak, Moderate, or Strong mode. When the video quality preference category of noise reduction is set to Weak, the strength of the MCTF is equal to Base Strength−delta, where Base Strength=the strength from Table 1 based on the classification of the noise and signal stress, and delta=MIN(2, (Base Strength+1)/2). When the video quality preference category of noise reduction is set to Moderate, the strength of the MCTF is equal to the strength from Table 1 based on the classification of the noise and signal stress. Thus, in an embodiment, the strength of the MCTF when noise reduction is set to Moderate is the same as when noise reduction is set to Automatic. When the video quality preference category of noise reduction is set to Strong, the strength of the MCTF is equal to Base Strength+delta, where Base Strength=the strength from Table 1 based on the classification of the noise and signal stress, and delta=MIN(2, (Base Strength+1)/2).

In certain embodiments, the current strength of the MCTF is filtered with its previous strength value for purposes of promoting smooth transitions when adjusting the strength of the filter. For example, the current strength of the MCTF= ($strength_{previous}$+the current strength of the MCTF)>>1.

Configuring the Sharpening Preprocessing Filter

Table 2 depicts the adaptive strength of the sharpening preprocessing filter operating in automatic mode:

TABLE 2

|    | VC | C | SN | N | VN |
|----|----|----|----|----|----|
| NS | 2  | 2 | 1  | 1 | 1  |
| S  | 2  | 2 | 1  | 1 | 0  |
| VS | 0  | 0 | 0  | 0 | 0  |

As with Table 1, in Table 2 the strength values 1-5 correspond to Very Weak (VW), Weak (W), Medium (M), Strong (S), to Very Strong (VS) respectively. A strength value of 0 indicates that the filter is disabled. In an embodiment, when the video quality preference category of picture enhancement has a value of automatic, the strength settings of the sharpening preprocessing filter are those depicted in FIG. 2. Note that the particular strength setting of the sharpening preprocessing filter will depend upon whether the complexity-output bit rate ratio (or basequant) is non-stressful (NS), stressful (S) and very stressful (VS). Further note that the particular strength setting of the sharpening preprocessing filter will depend upon whether the level of noise in the digital video is deemed Very Clean (VC), Clean (C), Slightly Noisy (SN), Noisy (N), or Very Noisy (VN). Any approach for classify the level of noise into the categories may be used to classify the level of noise as VC, C, SN, N, or VN as well as whether the signal is deemed to be very stressful (VS), stressful (S), or non-stressful (NS) by embodiments. Any approach for classifying the level of noise into the categories may be used to classify the level of noise as VC, C, SN, N, or VN by embodiments; similarly, any approach for classifying the stress of the video signal into the categories may be used to classify the stress of the video signal as VS, S, or NS by embodiments.

The strength of the sharpening preprocessing filter will be automatically adapted by adaptive video preprocessor 120 when the video quality preference category of picture enhancement is in either Weak, Moderate, or Strong mode. When the video quality preference category of picture enhancement is set to Weak, the strength of the sharpening preprocessing filter is equal to Base Strength−delta, where Base Strength=the strength from Table 2 based on the classification of the noise and signal stress, and delta=MIN (2, (Base Strength+1)/2). When the video quality preference category of picture enhancement is set to Moderate, the strength of the sharpening preprocessing filter is equal to the strength from Table 1 based on the classification of the noise and signal stress. Thus, in an embodiment, the strength of the sharpening preprocessing filter when noise reduction is set to Moderate is the same as when noise reduction is set to Automatic. When the video quality preference category of picture enhancement is set to Strong, the strength of the sharpening preprocessing filter is equal to Base Strength+ delta, where Base Strength=the strength from Table 1 based on the classification of the noise and signal stress, and delta=MIN(2, (Base Strength+1)/2).

In certain embodiments, the current strength of the sharpening preprocessing filter is filtered with its previous strength value for purposes of promoting smooth transitions when adjusting the strength of the filter. For example, the current strength of the sharpening preprocessing filter= ($strength_{previous}$+the current strength of the sharpening preprocessing filter)>>1.

Configuring the Chroma Boost Preprocessing Filter

Table 3 depicts the adaptive strength of the chroma boost preprocessing filter operating in automatic mode:

TABLE 3

|    | VC | C | SN | N | VN |
|----|----|---|----|---|----|
| NS | 1  | 1 | 1  | 2 | 2  |
| S  | 1  | 1 | 1  | 2 | 3  |
| VS | 3  | 3 | 3  | 3 | 3  |

As with Tables 1-2, in Table 3 the strength values 1-5 correspond to Very Weak (VW), Weak (W), Medium (M), Strong (S), to Very Strong (VS) respectively. A strength value of 0 indicates that the filter is disabled. In an embodiment, when the video quality preference category of picture enhancement has a value of automatic, the strength settings of the chroma boost preprocessing filter are those depicted in FIG. 3. Note that the particular strength setting of the chroma boost preprocessing filter will depend upon whether the complexity-output bit rate ratio (or basequant) is non-stressful (NS), stressful (S) and very stressful (VS). Further note that the particular strength setting of the chroma boost preprocessing filter will depend upon whether the level of noise in the digital video is deemed Very Clean (VC), Clean (C), Slightly Noisy (SN), Noisy (N), or Very Noisy (VN). Any approach for classify the level of noise into the categories may be used to classify the level of noise as VC, C, SN, N, or VN as well as whether the signal is deemed to be very stressful (VS), stressful (S), or non-stressful (NS) by embodiments. Any approach for classifying the level of noise into the categories may be used to classify the level of noise as VC, C, SN, N, or VN by embodiments; similarly, any approach for classifying the stress of the video signal into the categories may be used to classify the stress of the video signal as VS, S, or NS by embodiments.

The strength of the chroma boost preprocessing filter will be automatically adapted by adaptive video preprocessor 120 when the video quality preference category of picture enhancement is in either Weak, Moderate, or Strong mode. When the video quality preference category of picture enhancement is set to Weak, the strength of the sharpening preprocessing filter is equal to Base Strength−delta, where Base Strength=the strength from Table 3 based on the classification of the noise and signal stress, and delta=MIN (2, (Base Strength+1)/2). When the video quality preference category of picture enhancement is set to Moderate, the strength of the chroma boost preprocessing filter is equal to the strength from Table 3 based on the classification of the noise and signal stress. Thus, in an embodiment, the strength of the chroma boost preprocessing filter when noise reduction is set to Moderate is the same as when noise reduction is set to Automatic. When the video quality preference category of picture enhancement is set to Strong, the strength of the chroma boost preprocessing filter is equal to Base Strength+delta, where Base Strength=the strength from Table 3 based on the classification of the noise and signal stress, and delta=MIN(2, (Base Strength+1)/2).

In certain embodiments, the current strength of the chroma boost preprocessing filter is filtered with its previous strength value for purposes of promoting smooth transitions when adjusting the strength of the filter. For example, the current strength of the chroma boost preprocessing filter= ($strength_{previous}$+the current strength of the chroma boost preprocessing filter)>>1.

In an embodiment, when the sharpening preprocessing filter is disabled, too computationally expensive to perform, or otherwise unavailable, an additional constraint is applied to the strength of the chroma boost preprocessing filter. This is done to provide a more pleasing appearance to the digital video when sharpening preprocessing is not performed, e.g., due to sharpening processing being too computationally expensive. The chroma boost preprocessing filter saturates the colors, thus enhancing the picture and giving a perceptual appearance of more colors and sharpness. The processing that would have been performed by the unavailable sharpening preprocessing filter enhances the edges and gives a sharper appearance. Both the chroma boost and the sharpening preprocessing filter are used to complement each other so that the enhanced appearance is kept constant. In this way, when sharpening preprocessing becomes prohibitive, chroma boost preprocessing may be performed instead.

The additional constraint applied to the strength of the chroma boost preprocessing filter may be implemented by an embodiment as follow:
Chroma_boost_strength'=(3−sharpening_strength)
For a "Weak" setting: Chroma_boost_strength=MIN(2, MAX(Chroma_boost_strength, Chroma_boost_strength')
For a "Moderate" setting: Chroma_boost_strength=MIN(3, MAX(Chroma_boost_strength, Chroma_boost_strength')
For a "Strong" setting: Chroma_boost_strength=MIN(3, MAX(Chroma_boost_strength, Chroma_boost_strength')
Configuring the Horizontal Low-Pass Preprocessing Filter Table 4 depicts the adaptive strength of the horizontal low-pass preprocessing filter (HLPF) operating in automatic mode:

TABLE 4

|    | VC | C | SN | N | VN |
|----|----|---|----|---|----|
| NS | 1  | 1 | 2  | 2 | 2  |
| S  | 1  | 1 | 2  | 2 | 3  |
| VS | 2  | 2 | 3  | 3 | 3  |

As with Tables 1-3, in Table 4 the strength values 1-5 correspond to Very Weak (VW), Weak (W), Medium (M), Strong (S), to Very Strong (VS) respectively. A strength value of 0 indicates that the filter is disabled. In an embodiment, when the video quality preference category of stress bias has a value of automatic, the strength settings of the chroma boost preprocessing filter are those depicted in FIG. 3. Note that the particular strength setting of the horizontal low-pass preprocessing filter (HLPF) will depend upon whether the complexity-output bit rate ratio (or basequant) is non-stressful (NS), stressful (S) and very stressful (VS). Further note that the particular strength setting of the horizontal low-pass preprocessing filter (HLPF) will depend upon whether the level of noise in the digital video is deemed Very Clean (VC), Clean (C), Slightly Noisy (SN), Noisy (N), or Very Noisy (VN). Any approach for classify the level of noise into the categories may be used to classify the level of noise as VC, C, SN, N, or VN as well as whether the signal is deemed to be very stressful (VS), stressful (S), or non-stressful (NS) by embodiments. Any approach for classifying the level of noise into the categories may be used to classify the level of noise as VC, C, SN, N, or VN by embodiments; similarly, any approach for classifying the stress of the video signal into the categories may be used to classify the stress of the video signal as VS, S, or NS by embodiments.

The strength of the horizontal low-pass preprocessing filter (HLPF) will be automatically adapted by adaptive video preprocessor 120 when the video quality preference category of stress bias is in either Cleaner, Balanced, or Sharper mode. When the video quality preference category of stress bias is set to Sharper, the strength of the horizontal low-pass preprocessing filter (HLPF) is equal to Base Strength−delta, where Base Strength=the strength from Table 4 based on the classification of the noise and signal stress, and delta=MIN(2, (Base Strength+1)/2). When the video quality preference category of stress bias is set to Balanced, the strength of the horizontal low-pass preprocessing filter (HLPF) is equal to the strength from Table 4 based on the classification of the noise and signal stress. When the video quality preference category of stress bias is set to Cleaner, the strength of the horizontal low-pass preprocessing filter (HLPF) is equal to Base Strength+delta, where Base Strength=the strength from Table 4 based on the classification of the noise and signal stress, and delta=MIN (2, (Base Strength+1)/2).

In certain embodiments, the current strength of the horizontal low-pass preprocessing filter (HLPF) is filtered with its previous strength value for purposes of promoting smooth transitions when adjusting the strength of the filter. For example, the current strength the horizontal low-pass preprocessing filter (HLPF)=(strength$_{previous}$+the current strength of the horizontal low-pass preprocessing filter (HLPF))>>1.

Configuring the Deblocking Preprocessing Filter

Table 5 depicts the adaptive strength of the deblocking preprocessing filter operating in automatic mode:

TABLE 5

|     | VC | C | SN | N | VN |
| --- | --- | --- | --- | --- | --- |
| NS  | 1 | 1 | 1 | 1 | 1 |
| S   | 1 | 1 | 1 | 2 | 2 |
| VS  | 2 | 2 | 2 | 2 | 2 |

As with Tables 1-4, in Table 5 the strength values 1-5 correspond to Very Weak (VW), Weak (W), Medium (M), Strong (S), to Very Strong (VS) respectively. A strength value of 0 indicates that the filter is disabled. In an embodiment, when the video quality preference category of noise reduction has a value of automatic, the strength settings of the chroma boost preprocessing filter are those depicted in FIG. 4. Note that the particular strength setting of the deblocking preprocessing filter will depend upon whether the complexity-output bit rate ratio (or basequant) is non-stressful (NS), stressful (S) and very stressful (VS). Further note that the particular strength setting of the deblocking preprocessing filter will depend upon whether the level of noise in the digital video is deemed Very Clean (VC), Clean (C), Slightly Noisy (SN), Noisy (N), or Very Noisy (VN). Any approach for classify the level of noise into the categories may be used to classify the level of noise as VC, C, SN, N, or VN as well as whether the signal is deemed to be very stressful (VS), stressful (S), or non-stressful (NS) by embodiments. Any approach for classifying the level of noise into the categories may be used to classify the level of noise as VC, C, SN, N, or VN by embodiments; similarly, any approach for classifying the stress of the video signal into the categories may be used to classify the stress of the video signal as VS, S, or NS by embodiments.

The strength of the deblocking preprocessing filter will be automatically adapted by adaptive video preprocessor 120 when the video quality preference category of noise reduction is in either Weak, Moderate, or Strong mode. When the video quality preference category of noise reduction is set to Weak, the strength of the deblocking preprocessing filter is equal to Base Strength−delta, where Base Strength=the strength from Table 3 based on the classification of the noise and signal stress, and delta=MIN(2, (Base Strength+1)/2). When the video quality preference category of noise reduction is set to Moderate, the strength of the deblocking preprocessing filter is equal to the strength from Table 3 based on the classification of the noise and signal stress. Thus, in an embodiment, the strength of the deblocking preprocessing filter when noise reduction is set to Moderate is the same as when noise reduction is set to Automatic. When the video quality preference category of noise reduction is set to Strong, the strength of the deblocking preprocessing filter is equal to Base Strength+delta, where Base Strength=the strength from Table 3 based on the classification of the noise and signal stress, and delta=MIN(2, (Base Strength+1)/2).

In certain embodiments, the current strength of the deblocking preprocessing filter is filtered with its previous strength value for purposes of promoting smooth transitions when adjusting the strength of the filter. For example, the current strength the deblocking preprocessing filter= (strength$_{previous}$+the current strength of the deblocking preprocessing filter)>>1.

Configuring the MNR Preprocessing Filter

Table 6 depicts the adaptive strength of the mosquito noise reduction (MNR) preprocessing filter operating in automatic mode:

TABLE 6

|     | VC | C | SN | N | VN |
| --- | --- | --- | --- | --- | --- |
| NS  | 0 | 0 | 0 | 1 | 1 |
| S   | 0 | 0 | 1 | 1 | 1 |
| VS  | 1 | 1 | 2 | 2 | 2 |

As with Tables 1-5, in Table 6 the strength values 1-5 correspond to Very Weak (VW), Weak (W), Medium (M), Strong (S), to Very Strong (VS) respectively. A strength value of 0 indicates that the filter is disabled. In an embodiment, when the video quality preference category of noise reduction has a value of automatic, the strength settings of mosquito noise reduction (MNR) preprocessing filter are those depicted in FIG. 6. Note that the particular strength setting of the mosquito noise reduction (MNR) preprocessing filter will depend upon whether the complexity-output bit rate ratio (or basequant) is non-stressful (NS), stressful (S) and very stressful (VS). Further note that the particular strength setting of the mosquito noise reduction (MNR) preprocessing filter will depend upon whether the level of noise in the digital video is deemed Very Clean (VC), Clean (C), Slightly Noisy (SN), Noisy (N), or Very Noisy (VN). Any approach for classify the level of noise into the categories may be used to classify the level of noise as VC, C, SN, N, or VN as well as whether the signal is deemed to be very stressful (VS), stressful (S), or non-stressful (NS) by embodiments. Any approach for classifying the level of noise into the categories may be used to classify the level of noise as VC, C, SN, N, or VN by embodiments; similarly, any approach for classifying the stress of the video signal into the categories may be used to classify the stress of the video signal as VS, S, or NS by embodiments.

The strength of the mosquito noise reduction (MNR) preprocessing filter will be automatically adapted by adaptive video preprocessor 120 when the video quality preference category of noise reduction is in either Weak, Moderate, or Strong mode. When the video quality preference category of noise reduction is set to Weak, the strength of the mosquito noise reduction (MNR) preprocessing filter is equal to Base Strength–delta, where Base Strength=the strength from Table 3 based on the classification of the noise and signal stress, and delta=MIN(2, (Base Strength+1)/2). When the video quality preference category of noise reduction is set to Moderate, the strength of the mosquito noise reduction (MNR) preprocessing filter is equal to the strength from Table 3 based on the classification of the noise and signal stress. Thus, in an embodiment, the strength of the mosquito noise reduction (MNR) preprocessing filter when noise reduction is set to Moderate is the same as when noise reduction is set to Automatic. When the video quality preference category of noise reduction is set to Strong, the strength of the mosquito noise reduction (MNR) preprocessing filter is equal to Base Strength+delta, where Base Strength=the strength from Table 6 based on the classification of the noise and signal stress, and delta=MIN(2, (Base Strength+1)/2).

In certain embodiments, the current strength of the mosquito noise reduction (MNR) preprocessing filter is filtered with its previous strength value for purposes of promoting smooth transitions when adjusting the strength of the filter. For example, the current strength the mosquito noise reduction (MNR) preprocessing filter=(strength$_{previous}$+the current strength of the mosquito noise reduction (MNR) preprocessing filter (HLPF))>>1.

Handling Extremely Noisy and Stressful Content

In an embodiment, when the source digital video signal is considered extremely noisy or extremely stressful, additional processing may be performed. Embodiments may use different criteria or methodologies for determining what constitutes an extremely noisy or extremely stressful source digital video signal.

In an embodiment, if the source digital video signal is deemed extremely stressful at the present output bit rate by adaptive video preprocessor 120, then adaptive video preprocessor 120 may increase the strength of the motion compensated temporal preprocessing filter (MCTF), the mosquito noise reduction (MNR) preprocessing filter, and the deblocking preprocessing filter and decrease the strength of the sharpening preprocessing filter. Optionally, if the source digital video signal is deemed extremely stressful at the present output bit rate by adaptive video preprocessor 120, then adaptive video preprocessor 120 may increase the strength of the horizontal low-pass preprocessing filter (HLPF) as well.

In an embodiment, if the source digital video signal is deemed extremely noisy at the present output bit rate by adaptive video preprocessor 120, then adaptive video preprocessor 120 may increase the strength of the motion compensated temporal preprocessing filter (MCTF), the mosquito noise reduction (MNR) preprocessing filter, and the deblocking preprocessing filter and decrease the strength of the sharpening preprocessing filter.

With respect to how much to adjust the strength of certain preprocessing filters, in an embodiment, if the source digital video signal is considered extremely stressful, then the following adjustments may be dynamically made by adaptive video preprocessor 120:

delta_snr=MAX(delta_snr, 1)
delta_pe=MIN(−1, delta_pe)
where:
delta_snr=SNR delta to add before deriving final strength
delta_pe=Edge Enhancement delta to add before deriving final strength The initial value for each iteration of adaptation: delta_snr=delta_pe=delta_sb=delta_cb=0. The values of delta_snr is added to the calculated base strength of preprocessing filters associated with the video quality preference category of noise reduction. The values of delta_pe is added to the calculated base strength of preprocessing filters associated with the video quality preference category of picture enhancement.

When the adaptive video preprocessor 120 is processing digital video expressed in the MPEG2 protocol, a smoother video is preferred over a sharper video. One reason for this preference is the lack of in-loop deblocking in the MPEG 2 protocol unlike in the AVC protocol. Another reason is that for standard definition video, the sharpening strength may be restricted, e.g., it may be restricted to a value of 2.

When the adaptive video preprocessor 120 is processing digital video deemed to depict a fair amount of content in motion, adaptive video preprocessor 120 may dynamically increase the strength of the motion compensated temporal preprocessing filter (MCTF), the mosquito noise reduction (MNR) preprocessing filter, and the deblocking preprocessing filter and reduce the strength of the sharpening preprocessing filter. The motion compensated temporal preprocessing filter (MCTF) is relevant for processing high motion digital video, and the mosquito noise reduction (MNR) preprocessing filter and the deblocking preprocessing filter are relevant for processing compressed high motion content. In an embodiment, the adjustments to the preprocessing filters may be calculated as follows:

speed=avg_mini_gop_speed_x+avg_mini_gop_speed_y*(if progressive,1else2);

If (speed>15)
delta_snr=MAX(1, delta_snr);
delta_pe=MIN(−1, delta_pe);
The values of delta_snr is added to the calculated base strength of preprocessing filters associated with the video quality preference category of noise reduction. The values of delta_pe is added to the calculated base strength of preprocessing filters associated with the video quality preference category of picture enhancement.

Qmatrix adaptation may be used by an embodiment to address noise in the source digital video signal. To further improve the video quality further and to minimize the problems of overfiltering the noise (which could lead to underflows), the strengths of preprocessing filters 122 are restricted as:
  delta_snr=delta_pe=delta_sb=0
  mctf strength=3
  hlpf strength=mnr strength=deblocking strength=0
For picture with noisy segments,
  If avg_MBactClass3>5000
  delta_sb=MAX(1, delta_sb)
  delta_cb=MAX(1, delta_cb)
  If avg_MBactClass3>4000
  delta_sb=MAX(1, delta_sb)
  delta_cb=MAX(1, delta_cb)
  delta_sb=HLPF delta to add before deriving final strength
  delta_cb=Chroma Boost delta to add before deriving final strength
  Init for each iteration of adaptation:
    delta_snr=delta_pe=delta_sb=delta_cb=0;
In the above equations, the value avg_MBactClass3 represents the average macroblock activity for class 3. Embodiments may encode upto four different classes per image using different quants for perceptual quality coding.

Typically video is separated into four different classes based on the average_mb_activity of the picture. Classes could represent class 0 below 0.3*average_mb_activity, class 1 below 0.7*average_mb_activity, class 2 below 1.1*average_mb_activity, and class 3 above. Typically class 3 contains the higher activity macroblocks in a picture. The above equation is checking if there are higher activity segments or group of macroblocks, typically in class 3. The different classes are used for perceptual masking. Perceptual masking typically assigns lower qscales to lower activity classes and relatively higher value to higher classes to balance the distortion. Distortion is more visible to the human eye in low activity regions compared to high activity regions.

Stress Bias, Picture Enhancement and Source Noise Reduction Dependency

In most cases, the video quality preference categories of stress bias, noise reduction, and picture enhancement operate independently of each other. These categories are designed to address different aspects of digital video. The video quality preference category of stress bias is intended to control the stress on the encoded content through the horizontal low-pass preprocessing filter (HLPF) and encoding tools. The video quality preference category of noise reduction in intended to improve the compressibility of the digital video. The video quality preference category of picture enhancement is intended to improve the edges, contrast and colors in the digital video.

However, certain selected combinations of values for video quality preference categories may operate at cross-purposes with each other. To minimize such conflict in the values of the video quality preference categories that have been selected by a user, automatic adjustments may be made by adaptive video preprocessor 120 in some cases to the strength of certain preprocessing filters. To illustrate an example, in an embodiment, when the video quality preference category of stress bias is assigned the value of "cleaner" and the video quality preference categories of picture enhancement is set greater than "medium", then the relative strength of certain preprocessing filters associated with stress bias or picture enhancement is reduced (for example, by 1) by adaptive video preprocessor 120. As the user in this example chose a "cleaner" picture, the user has expressed a preference for video quality that is distortion free. However picture enhancement would act contrary to that goal by enhancing edges, colors and thus increasing the likelihood of introducing higher distortion. Therefore, the strength of preprocessing filters associated with picture enhancement is reduced to prevent this from happening.

As another example, in an embodiment, when the video quality preference category of stress bias is assigned the value of "Sharper Picture" and the video quality preference category of noise reduction is set greater than "Moderate", then the relative strength of certain preprocessing filters associated with noise reduction is reduced (for example, by 1) by adaptive video preprocessor 120, since preprocessing filters associated with noise reduction would work again providing a sharper picture.

Additional Adaptation Increment Strength

In certain circumstances when digital video is particularly noisy or particularly stressful, the strengths of preprocessing filters may be adjusted further. Embodiments of the invention may use a variety of different standards for determining what constitutes a particular noisy or stressful digital video.

Digital Video Encoding Based on Adaptive Pre-Filtering

In an embodiment, video encoder 130 may encode digital video from video source 110 using the information ("adaptive preprocessor information") gained from adaptive video preprocessor 120 performing adaptive pre-processing using preprocessing filters 122. Such adaptive preprocessor information may include, at a minimum, which selections were made in the stress bias video quality preference category. For example, video encoder 130 may optimize encoding based on the which option in the stress bias video quality preference category, such as sharp, balanced, or clear digital video, has been selected by the operator of system 100.

A typical video codec works by breaking the picture into discrete blocks (8×8 pixels in the case of MPEG). These blocks can then be subjected to discrete cosine transform (DCT) to calculate the frequency components, both horizontally and vertically. The resulting block (the same size as the original block) is then pre-multiplied by the quantization scale code and divided element-wise by a quantization matrix, and rounding each resultant element. The quantization matrix is designed to provide more resolution to more perceivable frequency components over less perceivable components (usually lower frequencies over high frequencies) in addition to transforming as many components to 0, which can be encoded with greatest efficiency. The extent of the reduction may be varied by changing the quantizer scale code, taking up much less bandwidth than a full quantizer matrix.

Video encoder 130 may use adaptive preprocessor information in calculating deadzone or quantization rounding offsets used by video encoder 130 in performing encoding. To illustrate, for various video standards such as MPEG2 and AVC, quantization offsets may be adapted per transform coefficient. Depending on the amount of adaptation, bitrate, and content complexity, the quantization offsets may be designed to provide the encoded picture with different visually perceptible characteristics, such as a sharper and/or noisier video quality vs. a softer and/or cleaner video quality for example.

In the prior art, the scope of the deadzone (a term used to describe the input range where the output is zero) is not adapted based on stress bias values. However, to achieve digital video having an improved visually perceptible measure of quality, embodiments of the invention may increase the scope of the deadzone for reference pictures. In some embodiments, to increase the scope of the deadzone, the deadzone may be defined as the input range where the output is less than 0.5.

Different video standards may support different types of video frames reference pictures. For example, the MPEG2 video standard employs only I and P video frames as reference pictures, while the AVC and HEVC video standards use I, P and (hierarchical) B video frames as reference pictures.

Embodiments may increase the scope of the deadzone for reference pictures for purposes of performing increased amounts of temporal smoothing and masking on the non-reference B pictures and improving the visually perceptible quality of the reference pictures. For example, for reference pictures, the intra deadzone may use 0.375 for intra macroblocks and 0 rounding or truncation deadzone on inter macroblocks. However, for non-reference B pictures, the deadzone for both intra and inter macroblocks may be set to zero. Embodiments may use these techniques on a variety of different video standards, such as AVC and MPEG.

As humans are more sensitive to variations in brightness than in color, in an embodiment, video encoder 130 is optimized to devote more bandwidth to the luma or luminance component (usually denoted Y') than to the color difference components Cb and Cr. Video encoder 130 may do so in the 4:2:0 sampling space, for example, by sampling both chrominance components by ½ in both horizontal and vertical directions. Typically, the luminance component consumes the majority of the bits allocated for a given picture and the rest of the bits are consumed by the chrominance components. However, overly quantizing the chroma in the encoding process can result in less perceptible quality and more color artifacts such as color bleeds and washed out colors. On the other hand, spending slightly more bits on chroma improves the perceived video quality significantly. However, care needs to be taken to achieve a finer balance so that additional bits spent on chroma do not affect the quality of the luminance component. This poses an optimization problem at both lower and higher end of the bitrates.

To illustrate how video encoder 130 addresses this issue using the AVC video standard, the AVC video standard provides chroma_qp_index_offset and second chroma_qp_index_offset syntax elements to offset the chroma quantization parameter with respect to the luma quantization parameter. The value of both of these offsets can range between −12 to +12, where negative values result in improved perceived quality.

In an embodiment, video encoder 130 may adjust stress bias settings in the AVC video standard to adjust the visually perceptual quality of the video. For example, in an embodiment, to provide a sharper picture, video encoder 130 may set the chroma_qp_index_offset and second chroma_qp_index_offset to −2. As another example, to provide a balanced picture, video encoder 130 may set the chroma_qp_index_offset and second chroma_qp_index_offset to −1. As another example, to provide a cleaner picture, video encoder 130 may set the chroma_qp_index_offset and second chroma_qp_index_offset to 1.

Another example will be provided with reference to the peak signal to noise ratio (PSNR) mode of video encoder 130, which is a mode that seeks to achieve the best objective score as measured by peak signal to noise ratio (PSNR), differential mean opinion score (DMOS) and picture quality rating (PQR). Note that the best objective score does not necessarily result in the video encodings with best subjective quality. Also, in measuring the objective score, luma scores are generally favored over chroma scores. In the performance of PSNR mode, video encoder 130 may set the chroma_qp_index_offset and second chroma_qp_index_offset to 0. The range of values embodiments may employ for the chroma_qp_index_offset and second chroma_qp_index_offset are (−2, 2).

In an embodiment, video encoder 130 may use quantization matrix adaptation (using a custom quantization matrix) and/or coefficient zeroing to adjust the video based on a user's video quality preferences. Using this approach, video encoder 130 does not override the quantization matrix adaptation, but instead, changes the quantization matrix adaptation used for qmatrix_idx==1, which is the default quantization matrix. As a result, the quantization matrices signaled to the decoder will not change and will stay at the default/customequant matrices. However, video encoder 130 uses the coefficient zeroing technique to change to value of coefficients in cells to zero where the quant matrix specifies 255. Since those coefficients are coded with a value of zero there is no need to send the quant matrix coefficient to arrive at that zero value.

The slope of the quantization matrix adaptation along with coefficient zeroing may be used by video encoder 130 to produce encoded digital video in accordance with the user's video quality preferences regarding a sharper or noisier picture, when flat slope and no coefficient zeroing is used. Video encoder 130 may use a quantization matrix with a steeper slope along with coefficient zeroing to produce encoded digital video in accordance with the user's video quality preferences regarding a softer or cleaner picture.

Intra-frame coding is used in video encoding (compression). The term intra-frame coding refers to the fact that the various lossless and lossy compression techniques are performed relative to information that is contained only within the current frame and not relative to any other frame in the video sequence. In other words, no temporal processing is performed outside of the current picture or frame.

Table 7 depicted below illustrates a non-limiting example of a quantization matrix suitable for obtaining a sharper picture for MPEG-2 intra-frame coding.

TABLE 7

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

An inter frame is a frame in a video compression stream which is expressed in terms of one or more neighboring frames. The "inter" part of the term refers to the use of Inter frame prediction. This kind of prediction takes advantage from temporal redundancy between neighboring frames to achieve higher compression rates. Table 8 depicted below illustrates a non-limiting example of a quantization matrix suitable for obtaining a sharper picture for MPEG-2 inter-frame coding when qmatrix_idx==1.

TABLE 8

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

Table 9 depicted below illustrates a non-limiting example of a quantization matrix suitable for obtaining a sharper picture for MPEG-2 inter-frame coding when qmatrix_idx==2. The steeper quant matrix when qmatrix_idx==2 shall be described in greater detail below.

TABLE 9

| 20 | 21 | 26 | 29 | 41  | 46  | 53  | 61  |
|----|----|----|----|-----|-----|-----|-----|
| 21 | 26 | 29 | 39 | 46  | 53  | 61  | 66  |
| 26 | 29 | 41 | 46 | 51  | 61  | 64  | 69  |
| 29 | 36 | 44 | 48 | 53  | 64  | 66  | 75  |
| 36 | 44 | 48 | 53 | 63  | 65  | 75  | 113 |
| 44 | 48 | 53 | 63 | 65  | 75  | 113 | 135 |
| 46 | 51 | 60 | 65 | 75  | 113 | 135 | 159 |
| 51 | 60 | 65 | 75 | 113 | 135 | 159 | 209 |

Table 10 depicted below illustrates a non-limiting example of a quantization matrix suitable for obtaining a sharper picture for AVC intra-frame 4×4 coding and inter 4×4 for all three components Y, Cb, Cr when qmatrix_idx==1.

TABLE 10

| 16 | 16 | 16 | 16 |
|----|----|----|----|
| 16 | 16 | 16 | 16 |
| 16 | 16 | 16 | 16 |
| 16 | 16 | 16 | 16 |

Table 11 depicted below illustrates a non-limiting example of a quantization matrix suitable for obtaining a sharper picture for AVC intra-frame 8×8 coding and inter 8×8 for all three components Y, Cb, Cr when qmatrix_idx==1.

TABLE 11

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

Table 12 depicted below illustrates a non-limiting example of a quantization matrix suitable for obtaining a balanced picture for AVC intra-frame 4×4 coding and inter 4×4 for all three components Y, Cb, Cr when qmatrix_idx==1.

TABLE 12

| 16 | 16 | 16 | 16 |
|----|----|----|----|
| 16 | 16 | 16 | 16 |
| 16 | 16 | 16 | 16 |
| 16 | 16 | 16 | 16 |

Table 13 depicted below illustrates a non-limiting example of a quantization matrix suitable for obtaining a balanced picture for AVC intra-frame 8×8 coding and inter 8×8 for all three components Y, Cb, Cr when qmatrix_idx==1.

TABLE 13

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

The quantization matrix of Table 7 may also serve as an example of a quantization matrix suitable for obtaining a balanced picture for MPEG-2 intra-frame coding, as the quantization matrix suitable for MPEG-2 intra-frame coding for obtaining a balanced picture and a sharper picture are similar. In the same fashion, the quantization matrix of Table 9 may also serve as an example of a quantization matrix suitable for obtaining a balanced picture for MPEG-2 intra-frame coding, as the quantization matrix suitable for MPEG-2 intra-frame coding for obtaining a balanced picture and a sharper picture are similar.

Table 14 depicted below illustrates a non-limiting example of a quantization matrix suitable for obtaining a sharper picture for MPEG-2 inter-frame coding when qmatrix_idx==1.

TABLE 14

| 16 | 17 | 18 | 19 | 20 | 21 | 22 | 23 |
|----|----|----|----|----|----|----|----|
| 17 | 18 | 19 | 20 | 21 | 22 | 23 | 24 |
| 18 | 19 | 20 | 21 | 22 | 23 | 24 | 25 |
| 19 | 20 | 21 | 22 | 23 | 24 | 26 | 27 |
| 20 | 21 | 22 | 23 | 25 | 26 | 27 | 28 |
| 21 | 22 | 23 | 24 | 26 | 27 | 28 | 30 |
| 22 | 23 | 24 | 26 | 27 | 28 | 30 | 31 |
| 23 | 24 | 25 | 27 | 28 | 30 | 31 | 33 |

Video encoder 130 may use a quantization matrix with a steeper slope along with coefficient zeroing to produce encoded digital video in accordance with the user's video quality preferences regarding a cleaner picture. The quantization matrix of Table 7 may also serve as an example of a quantization matrix suitable for obtaining a cleaner picture for MPEG-2 intra-frame coding, as the quantization matrix suitable for MPEG-2 intra-frame coding for obtaining a cleaner picture and a sharper picture are similar. Also, the quantization matrix of Table 14 may also serve as an example of a quantization matrix suitable for obtaining a cleaner picture for MPEG-2 inter-frame coding when qmatrix_idx==1, as the quantization matrix suitable for MPEG-2 intra-frame coding for obtaining a cleaner picture and a balanced picture are similar for MPEG-2 inter-frame coding when qmatrix_idx==1. In the same fashion, the quantization matrix of Table 9 may also serve as an example of a quantization matrix suitable for obtaining a cleaner picture for MPEG-2 inter-frame coding when qmatrix_idx==2, as the quantization matrix suitable for MPEG-2 intra-frame coding for obtaining a cleaner picture and a sharper picture are similar for MPEG-2 inter-frame coding when qmatrix_idx==2.

Video encoder 130 may use a quantization matrix with a steeper slope for the AVC video standard. Table 15 depicted below illustrates a non-limiting example of a quantization matrix suitable for obtaining a cleaner picture for AVC intra-frame 4×4 coding for all three components Y, Cb, Cr.

TABLE 15

| 6 | 13 | 20 | 28 |
|---|----|----|----|
| 13 | 20 | 28 | 32 |
| 20 | 28 | 32 | 37 |
| 28 | 32 | 37 | 42 |

Table 16 depicted below illustrates a non-limiting example of a quantization matrix suitable for obtaining a cleaner picture for AVC inter-frame 4×4 coding for all three components Y, Cb, Cr.

TABLE 16

| 10 | 14 | 20 | 24 |
|----|----|----|----|
| 14 | 20 | 24 | 27 |
| 20 | 24 | 27 | 30 |
| 24 | 27 | 30 | 34 |

Table 17 depicted below illustrates a non-limiting example of a quantization matrix suitable for obtaining a cleaner picture for AVC intra-frame 8×8 coding for all three components Y, Cb, Cr.

TABLE 17

| 6  | 10 | 13 | 16 | 18 | 23 | 25 | 27 |
|----|----|----|----|----|----|----|----|
| 10 | 11 | 16 | 18 | 23 | 25 | 27 | 29 |
| 13 | 16 | 18 | 23 | 25 | 27 | 29 | 31 |
| 16 | 18 | 23 | 25 | 27 | 29 | 31 | 33 |
| 18 | 23 | 25 | 27 | 29 | 31 | 33 | 36 |
| 23 | 25 | 27 | 29 | 31 | 33 | 36 | 38 |
| 25 | 27 | 29 | 31 | 33 | 36 | 38 | 40 |
| 27 | 29 | 31 | 33 | 36 | 38 | 40 | 42 |

Table 18 depicted below illustrates a non-limiting example of a quantization matrix suitable for obtaining a cleaner picture for AVC inter-frame 8×8 coding for all three components Y, Cb, Cr.

TABLE 18

| 9  | 13 | 15 | 17 | 19 | 21 | 22 | 24 |
|----|----|----|----|----|----|----|----|
| 13 | 13 | 17 | 19 | 21 | 22 | 24 | 25 |
| 15 | 17 | 19 | 21 | 22 | 24 | 25 | 27 |
| 17 | 19 | 21 | 22 | 24 | 25 | 27 | 28 |
| 19 | 21 | 22 | 24 | 25 | 27 | 28 | 30 |
| 21 | 22 | 24 | 25 | 27 | 28 | 30 | 32 |
| 22 | 24 | 25 | 27 | 28 | 30 | 32 | 33 |
| 24 | 25 | 27 | 28 | 30 | 32 | 33 | 35 |

Deblocking Filter Offsets

Video encoder 130 may employ a deblocking filter to produce encoded digital video in accordance with the user's video quality preferences. A deblocking filter is a video filter applied to decoded compressed video to improve visual quality and prediction performance by smoothing the sharp edges which can form between macroblocks when block coding techniques are used. The purpose of the deblocking filter is to improve the appearance of decoded pictures.

Certain video standards, such as AVC, perform in loop deblocking which adapts based on various factors such as qscale, motion vectors (mvs), and the macroblock types (mbtypes) of neighbor frames. Other deblocking filter control parameters, such as alpha and beta offsets, may be used by embodiments to control the sharper/noisier or softer cleaner video preference. The alpha offset controls the blockiness handling and the beta offset controls the ringing handling. In an embodiment, the adaptive deblocking strength algorithm employed by video encoder 130 adapts the deblocking strength based on characteristics of video content and quantization parameters. The deblocking strength is controlled by certain parameters such as picDeblkAlphaOffset and picDeblkBetaOffset; the deblocking filter is enabled by setting picDeblkIdc to equal 0. The parameters PicDeblkAlphaOffset and picDeblkBetaOffset are integer values limited to the range of −6 and +6. The alpha and beta offset values are transmitted in the slice header syntax. Reducing the strength of deblocking filtering is achieved by reducing the offset values and increasing the strength of deblocking filtering is achieved by increasing the offset values. The parameters picDeblkAlphaOffset and picDeblkBetaOffset may be modulated in video encoder 130 based upon motion data, basequant estimates, and picture type.

Basequant and Picture Type Adjustment for Adaptive Deblocking

In an embodiment, video encoder 130 may dynamically modify deblocking filter offsets to achieve various user specified stress bias video preferences. The offset bias that is used to modulate the seed offset of the final calculated offset may be decreased by some amount for a sharper picture or VQ mode, increased for a cleaner picture, and unchanged for a balanced picture. The offset in the equations below is the seed offset at the beginning of the set of calculations. The final calculated offset is the final calculated offset at the end of the calculations after various adjustments.

In an embodiment, the basequant offset for I and P pictures may be calculated using an estimate of the average base quant per macroblock. The estimate of the average basequant per macroblock is compared with a predetermined threshold. If the estimate of the average base quant per macroblock is less than the predetermined threshold, then the basequant offset is decremented. On the other hand, if the estimate of the average base quant per macroblock is greater than the predetermined threshold, then the basequant offset is incremented. Hysteresis may be employed in establishing the predetermined threshold. Note, the basequant offset need not change for each calculation interval.

Certain embodiments may constrain the basequant offset to be within the values of [−2,3]. To illustrate one example for calculating the final deblocking offset based on picture type, consider the following pseudocode, which reduces the deblocking strength for I and P pictures. In the pseudocode below, Offset_bias is implemented to modulate the basequant offset lower or higher to the base adaptation.

```
Offset_bias=0
  if (picRcType==B_PIC) {
    //do nothing no modulation of motion offset with base-
      quant
    offset=motion Data offset
  }
  else if (basequant offset==−1) {
    if (picRcType==I_PIC) {
      offset=motion data offset −2;
    }
```

```
else if (pPicProp->picRcType==P_PIC) {
    offset=motion data offset -1;
  }
}
else if (basequant offset==-2) {
  if (picRcType==I_PIC) {
    offset=motion data offset -4;
  }
  else if (picRcType==P_PIC) {
    offset=motion data offset -2;
  }
}
else {
  offset=motion data offset+basequant offset;
}
//constrain the offset to be within [-6, 3]
if (offset>(3+offset_bias)) {
  offset=3+offset_bias;
}
else if (offset<(-6+offset_bias)) {
  offset=-6+offset_bias;
}
```

In an embodiment, the alpha and beta offsets in the picture slice header are set to use the "offset" calculated in the above pseudocode, i.e., picDeblkAlphaOffset=picDeblkBetaOffset=offset.

QP Spreads and Number of QP Classes

To improve the perceptual quality of the encoded video, video encoder 130 takes advantage of the Human Visual System (HVS) model. The HVS model recognizes that human eyes are more susceptible to artifacts in the soft areas as opposed to busy areas. The HVS model further recognizes that human eyes are better equipped to perceive contrast as well as artifacts more in slightly darker areas than brighter areas. To improve the perceptual quality of the encoded video, various parts of the same frame are encoded to possess different levels of quality by applying different quantization. This is done by segmenting the frame in various QP classes. The classification is carried out by using the average macroblock activity of the macroblock with respect to the average macroblock activity for the whole picture.

To optimize the perceptual quality of video produced by video encoder 130, it is desirable for video encoder 130 to process a given picture with multiple quantization parameters (QP) per picture. Different QPs may be assigned to each macroblock within a picture. This practice, however, poses an optimization problem as the overhead of sending the delta QP (the delta QP is the difference between the actual quantization parameter of the macroblock and the predicted quantization parameter of the macroblock predicted by video encoder 130 in accordance with the AVC standard) needs be balanced with the bits spent on coding the given macroblocks. For purposes of minimizing the delta QP overhead and improving the perceptual quality, a picture is divided into a number of groups of macroblocks. Each group of macroblocks (where the group is referred to as a QP class) is assigned a single QP. For example, if a picture is divided into 4 groups of macroblocks, this would result in 4 QP classes for that picture. Note that any given picture may be assigned 1 to 4 QPs (this it is possible for a picture to have less than 4 QPs assigned thereto), as the total number of QPs assigned to a particular picture is a function of content complexity and bitrate complexity.

The difference between the lowest assigned QP and highest assigned QP within the picture is represented by the QP spread. The QP for a particular QP class is calculated as look-ahead complexity of the given class divided by rate allocated for that class during a given period, e.g., a second. The subjective vs. objective quality is balanced as a function of number of classes, e.g., from 1 to 4. As a function of content complexity and bitrate complexity, the best subjective quality is achieved by having more QP classes to balance the perceptual quality across various macroblock classes. Content complexity refers to spatial complexity measured by average macroblock activity. Bitrate complexity is Xclass=bits* qscale of class. The best objective score can be achieved by having just 1 QP class but may not necessarily yield the best subjective quality. As a result the number of QP classes assigned to a particular picture is determined to maximize the objective and subjective quality as a function of adjusting the number of classes.

Either a QP spread of zero, or a single class for the whole picture, or the same average QP for the whole picture would provide the best objective score but would reduce the perceived visual quality. As a result, in an embodiment, to optimize the perceived or subjective visual quality, the average quant of the lower 3 QP classes is calculated. This calculated value is used as the QP for the lower 3 QP classes. In effect, the lower 3 classes are merged into a single QP class which is assigned a single QP, which results in effectively 2 resulting QP classes, namely the 1 non-merged (the highest QP class) and the 1 merged from the original 3 lower QP classes. This technique reduces the QP delta overhead which may become a problem at lower bitrates. Thus, to achieve a better balance of subjective and objective quality, the objective mode of the encoder may use 2 QP classes instead of 1 QP even though it is known to the inventors that a single QP class will yield the best objective score.

In an embodiment, the QP spread for a picture is unconstrained by video encoder 130 so that the QP spread can vary between the minimum and maximum QPs allowed by the pertinent coding standard. The QP spread will be reduced by video encoder 130 if bits become available from the lower classes for the high activity class. This is the principle advantage of reducing the number of QP classes in that it balances the perceptual quality between the lower and higher QP classes. The higher QP classes will typically consume disproportionately more bits when such classes consist of busy areas of the picture. When video encoder 130 is not operating in objective mode but rather in advanced mode, 3 QP classes are used by video encoder 130 for optimizing the visual quality. However, when video encoder 130 is operating in legacy mode, 4 QP classes are used for optimizing visual quality, which allows for variable user preferences and provides the user with enough choice to tune quality according to his or her tastes.

Objective Video Quality Mode

Video encoder 130 may operate in a variety of different video quality modes, such as high video quality mode and objective mode. The objective video quality mode is designed to achieve the best possible objective video quality. The objective video quality mode is not designed to produce the guaranteed highest video quality; on the contrary, the objective video quality mode is optimized to achieve a better subjective quality rather than being based on the best objective score.

When video encoder 130 is operating in objective mode, the pre-processing adaptation performed by adaptive video preprocessor 120 is bypassed. Objective scores are measured against a reference, namely the video that is input to video encoder 130. If pre-processing is performed by adaptive video preprocessor 120, the video will be modified to obtain a more pleasing appearance, but the objective score for the video will be degraded since the reference video has been modified. This is why it is necessary to bypass pre-filtering when calculating objective scores. If the pre-processing adaptation is performed by adaptive video preprocessor 120, pre-processing will change the video and the resulting metrics will favor video which has same features/noise as the original input source.

Various objective scoring metrics may be used by vendors to measure the objective video quality of the video. The objective scores obtained by objective scoring metric attempt to model the Human Visual System and its response to different stimuli, but these metrics are not well suited for Subjective Visual Quality. Thus, the video metric mechanisms such as mean squared error (MSE) used for peak signal to noise ratio (PSNR), differential mean opinion score (DMOS), and picture quality rating (PQR) are not well suited for modifying video to confirm to a set of subjective visual quality preferences. The HVS is a complex system to model. Metrics typically only measure the difference between the encoded video and the original video, but they cannot measure the perceived or subjective video quality, such as video which is less subjectively perceived to be noisy and artifact free while still subjectively being perceived as sharp and colorful.

As most metrics use a reference signal to measure the impairment caused by the encoding process, such metrics cannot differentiate between noise and features in video or treat impairments in the source video as features that they expect the encoding process to preserve. Metrics generally prefer a smooth, blurry video, whereas the human eye generally prefers a sharper and detailed/grainy video, even if that video differs more from the original. When video encoder 130 operates in objective video quality mode, objective scores like PSNR, PQR, DMOS may be decreased, but the encoded digital video produced by video encoder 130 is possess better perceived visual quality.

Different viewers may actually prefer a video quality somewhere in between that of the best objective score and the best perceived quality. Accordingly, certain embodiments of the invention may operate such that video encoder 130 encodes digital video using a configuration based on a predetermined compromise between high video quality mode and objective mode.

Advanced B Pictures Mode

In an embodiment, for non-reference B pictures, the deadzone for both intra and inter macroblocks is set to zero to achieve better temporal smoothing and masking on the non-reference B pictures, and thus, increase quality of the reference pictures. Also, as shown below in tables 19-23, in embodiments, video encoder 130 applies coefficient zeroing on the high frequency half of the quantization matrices.

FIG. 8 is a table that illustrates a non-limiting example of a quantization matrix suitable for when the stress bias mode is configured to be "sharper picture" and in PSNR mode for MPEG2 intra-frame coding when qmatrix_idx=1.

FIG. 9 is a table that illustrates a non-limiting example of a quantization matrix suitable for MPEG2 intra-frame coding when qmatrix_idx=1.

FIG. 10 is a table that illustrates a non-limiting example of a quantization matrix suitable for MPEG2 intra-frame coding when qmatrix_idx=2.

FIG. 11 is a table that illustrates a non-limiting example of a quantization matrix suitable for MPEG2 intra-frame coding.

FIG. 12 is a table that illustrates a non-limiting example of a quantization matrix suitable for AVC intra-frame coding for all three components.

Coefficient Shaping for High, Main and Baseline Profiles

Certain video standards may define sets of capabilities, individually referred to as a profile, to target specific classes of applications. For example, the H.264/MPEG-4 AVC video standard defines a variety of profiles for non-scalable 2D video applications, including a High Profile, a Main Profile, and a Baseline Profile. Video standards may also define a range of features that can be used across these profiles. For example, the AVC video standard only permits the use of qmatrices for the High Profile but not for the Baseline Profile or the Main Profile.

Embodiments of the invention use the Main Profile and the Baseline Profile in the AVC video standard as filters in the encode path without introducing any encoder-decoder mismatch as the filtering is done on the residual coefficients. The Elementary Stream syntax of the bitstream has elements which specify which qmatrix was used by the encoder so that the decoder uses the same qmatrix to recover the encoded signal. When a qmatrix is identified in this fashion, the qmatrix is said to be "signaled." When qmatrices can be signaled they will be signaled (for example, the High Profile in the AVC video standard would allow a qmatrix to be signaled); however, when qmatrices cannot be signaled the same datapath will be used to act as a 2-D coefficient filtering matrix for the and Baseline profiles.

Embodiments of the invention may modify the quantization path by using the qmatrices for certain profiles, such as the High, Main, and Baseline Profiles, to handle noise. For the AVC High Profile, the quant matrices (qmatrices) are switched from the default qmatrix 1 to qmatrix 2 or 3 and sent in the bitstream syntax. Doing so preserves the quality of the pictures or noise by using the same qmatrix between the encoder and decoder. In other words, the decoder uses the qmatrices to recover the coefficients in the inverse quantization stage. However, for the Main and Baseline Profiles, as AVC standard does not allow the use of qmatrices, the decoder does not use the qmatrices to recover the coefficients in the inverse quantization stage. Instead, in the Main and Baseline Profile, the qmatrices are used as internal indexes for using the same qmatrices as filters.

Only the High Profile uses the qmatrices in the inverse quantization stage (part of the encoder's picture reconstruction), but the Main and Baseline Profiles do not, which results in coefficient shaping in the dct/quantization domain for the Main and Baseline Profiles. Note that this does not introduce any mismatch between the decoder and the encoder for the Main and Baseline Profiles, since the same quantized coefficients are used for reconstructing the pictures.

Equation 1 illustrates the modifications that are used for the quantization stage of the High, Main and the Baseline Profiles.

$$X_q(i,j) = \text{sign}\{X(i,j)\} \times [(\{|X(i,j)| \times A(Q_M, i, j) \times 16\}/CQM(i,j) + f2^{15} + Q_E) >> (15 + Q_E)] - (eq-1.0), \quad \text{Equation 1}$$

where $X_q(i, j)$ is the quantized coefficient at location (i, j). The size may be 4×4 or 8×8. 4×4 is typically used for chroma and luma with dct size 4×4, while 8×8 is typically used for luma with dct size 8×8. X (i, j) is the transform coefficient at location (i, j).

$Q_M$→ QP mod 6
$Q_E$→ QP/6
$A(Q_M, i, j)$ is the quantization coefficients as defined in the AVC standard.
f→ is set between 0 and ½.

Note that the CQM(i, j), the qmatrix coefficient, is not used by the AVC standard for the Main and Baseline Profiles, but only the High Profile. This is the modification that is used for coefficient shaping in the dct/quantization domain for the Main and the Baseline Profiles. For the High Profile CQM, indices (or idx) 0, 1, and 2 are used. Index 0 is the default matrix as defined by the AVC standard. For the Main and Baseline Profiles, no CQM indices are used. Also, care must be taken when switching to CQMs in the Main and Baseline Profiles, as the loss is permanent because of the coefficient shaping, as the scaling cannot be recovered at the decoder end.

To illustrate how Equation 1 above does not lead to drift or encoder-decoder mismatch for the Main and Baseline Profiles, consider that separating Equation 1 into two parts yields Equation 1.1, corresponding to coefficient shaping in the dct/quantization domain, and Equation 1.2, corresponding to the AVC "standard" way of quantization.

$$X_{cs}(i,j)=X(i,j)\times 16/CQM(i,j) \quad \text{Equation 1.1}$$

$$X_q(i,j)=\text{sign}\{X_{cs}(i,j)\}\times[(\{|X_{cs}(i,j)|\times A(Q_M,i,j)\}+f2^{15+Q_E})>>(15+Q_E)] \quad \text{Equation 1.2}$$

Note that because Equation 1.1 is not reproduced on the decoder end, the loss because of scaling is permanent and would result in lost visual quality in the digital video.

Also for the Main and Baseline Profiles, it is that a CQM should not be used for intra macroblocks in inter pictures. When a CQM is used for intra macroblock in inter pictures, checkerboard/chessboard patterns are created.

Main profile uses only intra 4×4 on A6. Using a steeper CQM and 4×4 transform leads to further scaling down the residue heavily in intra MBs in inter pictures. When CQM is used, it will scale down the residue and the visual quality is reduced because the corresponding CQM scaling is not available at the decoder end for the Main Profile.

The inverse quantization path is kept same as defined by the AVC standard to avoid any encoder-decoder mismatches. For the inverse quantization stage of the high profile, Equation 1.3 is used.

$$X_r(i,j)=(X_q(i,j)\times\{B(Q_M,i,j)\times CQM(i,j)\}/16)<<Q_E \quad \text{Equation 1.3}$$

For the inverse quantization stage of the main and baseline profiles, Equation 1.4 is used.

$$X_r(i,j)=(X_q(i,j)\times B(Q_M,i,j))<<Q_E, \quad \text{Equation 1.4}$$

where $X_r(i, j)$ is the inverse quantized coefficient at location (i, j), and
$B(Q_M, i, j)$ is the inverse quantization coefficients as defined in the AVC standard.

In an embodiment, both the mode decision (md) and transform (txfm) stages use the exact same formulations, which avoids the drift in these two stages. Illustrative qmatrixes according to the above principles are provided below.

| Intra 4 × 4 Y-qmatrix 2 | | | |
|---|---|---|---|
| 7 | 13 | 21 | 29 |
| 13 | 21 | 29 | 33 |
| 21 | 28 | 33 | 37 |
| 29 | 33 | 37 | 43 |

| Inter 4 × 4 Y/U/V-qmatrix 2 | | | |
|---|---|---|---|
| 21 | 29 | 41 | 49 |
| 29 | 41 | 49 | 55 |
| 41 | 49 | 55 | 61 |
| 49 | 55 | 61 | 69 |

| Intra 8 × 8 Y - qmatrix 2 | | | | | | | |
|---|---|---|---|---|---|---|---|
| 7 | 11 | 13 | 17 | 19 | 23 | 25 | 27 |
| 11 | 13 | 17 | 19 | 23 | 25 | 27 | 29 |
| 13 | 17 | 19 | 23 | 25 | 27 | 29 | 31 |
| 17 | 19 | 23 | 25 | 27 | 29 | 31 | 33 |
| 19 | 23 | 25 | 27 | 29 | 31 | 33 | 37 |
| 23 | 25 | 27 | 29 | 31 | 33 | 37 | 39 |
| 25 | 27 | 29 | 31 | 33 | 37 | 39 | 41 |
| 27 | 29 | 31 | 33 | 37 | 39 | 41 | 43 |

| Intra 4 × 4 Y-qmatrix 3 | | | |
|---|---|---|---|
| 9 | 21 | 31 | 43 |
| 21 | 31 | 43 | 49 |
| 31 | 43 | 49 | 57 |
| 43 | 49 | 57 | 63 |

| Inter 4 × 4 Y/U/V-qmatrix 3 | | | |
|---|---|---|---|
| 30 | 43 | 61 | 73 |
| 43 | 61 | 73 | 81 |
| 61 | 73 | 81 | 91 |
| 73 | 81 | 91 | 103 |

| Intra 8 × 8 Y - qmatrix 3 | | | | | | | |
|---|---|---|---|---|---|---|---|
| 9 | 15 | 21 | 25 | 27 | 35 | 39 | 41 |
| 15 | 21 | 25 | 27 | 35 | 39 | 41 | 45 |
| 21 | 25 | 27 | 35 | 39 | 41 | 45 | 47 |
| 25 | 27 | 35 | 39 | 41 | 45 | 47 | 51 |
| 27 | 35 | 39 | 41 | 45 | 47 | 51 | 55 |
| 35 | 39 | 41 | 45 | 47 | 51 | 55 | 57 |
| 39 | 41 | 45 | 47 | 51 | 55 | 57 | 61 |
| 41 | 45 | 47 | 51 | 55 | 57 | 61 | 63 |

| Intra 4 × 4 U/V-qmatrix 2 | | | |
|---|---|---|---|
| 13 | 27 | 41 | 57 |
| 27 | 41 | 57 | 65 |
| 41 | 57 | 65 | 75 |
| 57 | 65 | 75 | 85 |

Inter 8 × 8 Y - qmatrix 2

| 19 | 27 | 31 | 35 | 39 | 43 | 45 | 49 |
|----|----|----|----|----|----|----|----|
| 27 | 31 | 35 | 39 | 43 | 45 | 49 | 51 |
| 31 | 35 | 39 | 43 | 45 | 49 | 51 | 55 |
| 35 | 39 | 43 | 45 | 49 | 51 | 55 | 57 |
| 39 | 43 | 45 | 49 | 51 | 55 | 57 | 61 |
| 43 | 45 | 49 | 51 | 55 | 57 | 61 | 65 |
| 45 | 49 | 51 | 55 | 57 | 61 | 65 | 67 |
| 49 | 51 | 55 | 57 | 61 | 65 | 67 | 71 |

Intra 4 × 4 U/V-qmatrix 3

| 15 | 33 | 51 | 71  |
|----|----|----|-----|
| 33 | 51 | 71 | 81  |
| 51 | 71 | 81 | 93  |
| 71 | 81 | 93 | 105 |

Inter 8 × 8 Y - qmatrix 3

| 27 | 39 | 45 | 51 | 57 | 63 | 67 | 73  |
|----|----|----|----|----|----|----|-----|
| 39 | 45 | 51 | 57 | 63 | 67 | 73 | 75  |
| 45 | 51 | 57 | 63 | 67 | 73 | 75 | 81  |
| 51 | 57 | 63 | 67 | 73 | 75 | 81 | 85  |
| 57 | 63 | 67 | 73 | 75 | 81 | 85 | 91  |
| 63 | 67 | 73 | 75 | 81 | 85 | 91 | 97  |
| 67 | 73 | 75 | 81 | 85 | 91 | 97 | 99  |
| 73 | 75 | 81 | 85 | 91 | 97 | 99 | 105 |

Hardware Mechanisms

Figure 7:
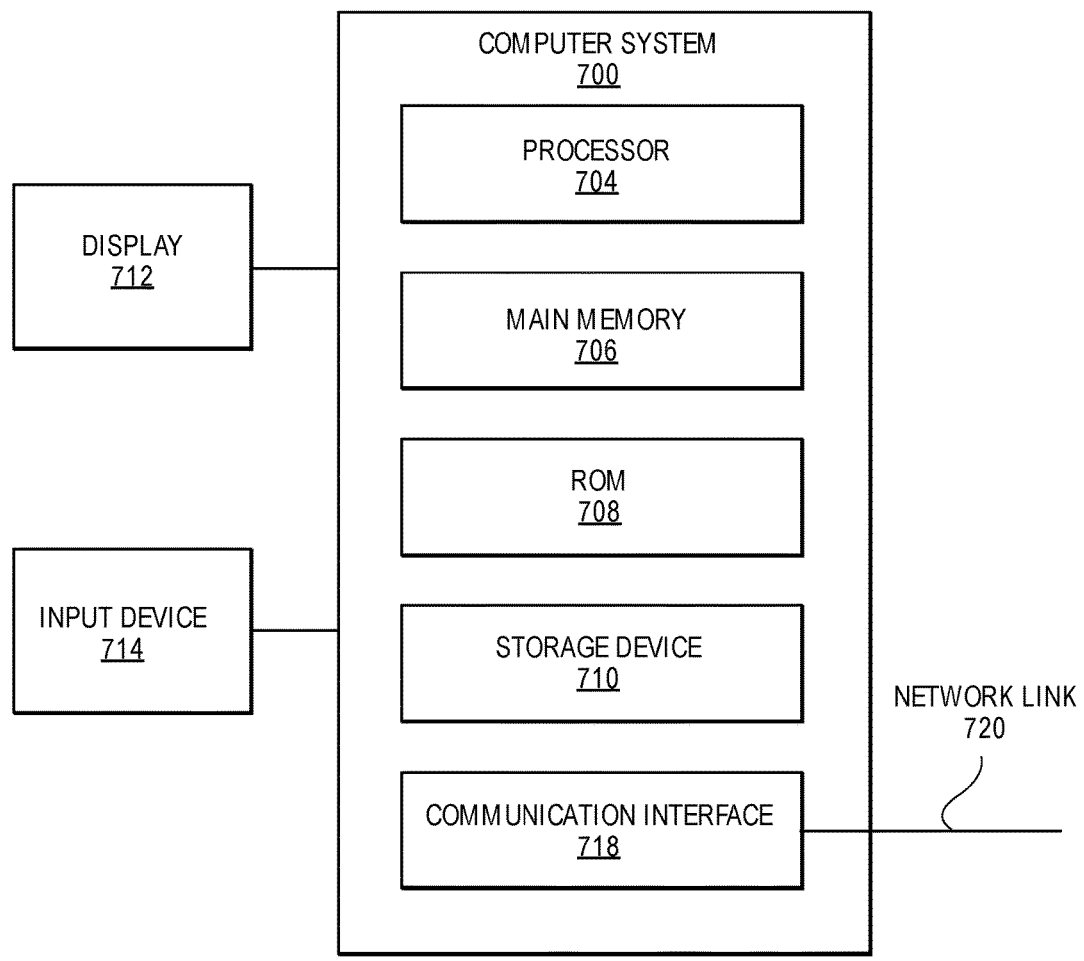
FIG. 7 is a block diagram that illustrates a computer system upon which an embodiment of the invention may be implemented.

In an embodiment, one or more of adaptive video pre-processor 120 and video encoder 130 depicted in FIG. 1 may be implemented by one or more computer systems. FIG. 7 is a block diagram that illustrates a computer system 700 upon which an embodiment of the invention may be implemented. In an embodiment, computer system 700 includes processor 704, main memory 706, ROM 708, storage device 710, and communication interface 718. Computer system 700 includes at least one processor 704 for processing information. Computer system 700 also includes a main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device for storing static information and instructions for processor 704. A storage device 710, such as a magnetic disk or optical disk, is provided for storing information and instructions.

Computer system 700 may be coupled to a display 712, such as a cathode ray tube (CRT), a LCD monitor, and a television set, for displaying information to a user. An input device 714, including alphanumeric and other keys, is coupled to computer system 700 for communicating information and command selections to processor 704. Other non-limiting, illustrative examples of input device 714 include a mouse, a trackball, or cursor direction keys for communicating direction information and command selections to processor 704 and for controlling cursor movement on display 712. While only one input device 714 is depicted in FIG. 7, embodiments of the invention may include any number of input devices 714 coupled to computer system 700.

Embodiments of the invention are related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 704 for execution. For example, the instructions may initially be carried on a magnetic disk of a remote computer. The remote computer can load the instructions into its dynamic memory and send the instructions over a network link 720 to computer system 700.

Communication interface 718 provides a two-way data communication coupling to a network link 720 that is connected to a local network. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through a local network to a host computer or to data equipment operated by an Internet Service Provider (ISP).

Computer system 700 can send messages and receive data, including program code, through the network(s), network link 720 and communication interface 718. For example, a server might transmit a requested code for an application program through the Internet, a local ISP, a local network, subsequently to communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums that store one or more sequences of instructions for encoding digital video, which when executed by one or more processors, cause:
   an adaptive video preprocessor determining adaptive preprocessor information for the digital video, wherein said adaptive preprocessor information is based, at least in part, on a current video complexity of the digital video and an output bit rate; and
   an encoder encoding the digital video to produce encoded digital video using the adaptive preprocessor information, wherein said encoder encoding the digital video comprises:
      the encoder dynamically adjusting how said digital video is encoded based on a selection, made by a user, regarding a stress bias video quality preference.

2. The one or more non-transitory computer-readable storage mediums of claim 1, wherein said encoder encoding the digital video comprises:
   the encoder using said adaptive preprocessor information to calculate deadzone or quantization rounding offsets used by said encoder in performing said encoding.

3. The one or more non-transitory computer-readable storage mediums of claim 1, wherein said encoder encoding the digital video comprises:
   the encoder modifying a scope of the deadzone based on a selection, made by a user, regarding a stress bias video quality preference.

4. The one or more non-transitory computer-readable storage mediums of claim 1, wherein said encoder encoding the digital video comprises:
   the encoder using a custom quantization matrix to encode said digital video based on a set of user video quality preferences.

5. The one or more non-transitory computer-readable storage mediums of claim 1, wherein said encoder encoding the digital video comprises:
   the encoder using a deblocking filter to encode said digital video based on a set of user video quality preferences.

6. The one or more non-transitory computer-readable storage mediums of claim 1, wherein said encoder encoding the digital video comprises:
   the encoder dynamically modifying a set of deblocking filter offsets to encode said digital video based on a set of user video quality preferences.

7. The one or more non-transitory computer-readable storage mediums of claim 6, wherein the encoder dynamically modifying said set of deblocking filter offsets comprises:
   the encoder dynamically decreasing a seed offset for an offset bias value of said deblocking filter to obtain a sharper video quality for said encoded digital video; and
   the encoder dynamically increasing said seed offset for said offset bias value of said deblocking filter to obtain a cleaner video quality for said encoded digital video.

8. The one or more non-transitory computer-readable storage mediums of claim 1, wherein said encoder encoding the digital video comprises:
   the encoder using a plurality of different quantizations to a single frame of said digital video to produce different levels of quality for said single frame in said encoded digital video.

9. An apparatus for encoding digital video, comprising:
   one or more processors; and
   one or more non-transitory computer-readable storage mediums, storing one or more sequences of instructions, which when executed, cause:
      an adaptive video preprocessor determining adaptive preprocessor information for the digital video, wherein said adaptive preprocessor information is based, at least in part, on a current video complexity of the digital video and an output bit rate; and
      an encoder encoding the digital video to produce encoded digital video using the adaptive preprocessor information, wherein said encoder encoding the digital video comprises:
         the encoder dynamically adjusting how said digital video is encoded based on a selection, made by a user, regarding a stress bias video quality preference.

10. The apparatus of claim 9, wherein said encoder encoding the digital video comprises:
    the encoder using said adaptive preprocessor information to calculate deadzone or quantization rounding offsets used by said encoder in performing said encoding.

11. The apparatus of claim 9, wherein said encoder encoding the digital video comprises:
    the encoder modifying a scope of the deadzone based on a selection, made by a user, regarding a stress bias video quality preference.

12. The apparatus of claim 9, wherein said encoder encoding the digital video comprises:
    the encoder using a custom quantization matrix to encode said digital video based on a set of user video quality preferences.

13. The apparatus of claim 9, wherein said encoder encoding the digital video comprises:
    the encoder using a deblocking filter to encode said digital video based on a set of user video quality preferences.

14. The apparatus of claim 9, wherein said encoder encoding the digital video comprises:
    the encoder dynamically modifying a set of deblocking filter offsets to encode said digital video based on a set of user video quality preferences.

15. The apparatus of claim 14, wherein the encoder dynamically modifying said set of deblocking filter offsets comprises:
    the encoder dynamically decreasing a seed offset for an offset bias value of said deblocking filter to obtain a sharper video quality for said encoded digital video; and
    the encoder dynamically increasing said seed offset for said offset bias value of said deblocking filter to obtain a cleaner video quality for said encoded digital video.

16. The apparatus of claim 9, wherein said encoder encoding the digital video comprises:

the encoder using a plurality of different quantizations to a single frame of said digital video to produce different levels of quality for said single frame in said encoded digital video.

17. A method for encoding digital video, comprising:
an adaptive video preprocessor determining adaptive preprocessor information for the digital video, wherein said adaptive preprocessor information is based, at least in part, on a current video complexity of the digital video and an output bit rate; and
an encoder encoding the digital video to produce encoded digital video using the adaptive preprocessor information, wherein said encoder encoding the digital video comprises:
the encoder dynamically adjusting how said digital video is encoded based on a selection, made by a user, regarding a stress bias video quality preference.

* * * * *